(12) United States Patent
Kakitsuka et al.

(10) Patent No.: US 7,075,864 B2
(45) Date of Patent: Jul. 11, 2006

(54) PRE-PIT SIGNAL GENERATOR COMPENSATING A PRE-PIT SIGNAL DAMPED, SEMICONDUCTOR INTEGRATED CIRCUIT, RECORDING AND PLAYBACK APPARATUS, AND PRE-PIT SIGNAL GENERATION METHOD

(75) Inventors: Yasuhiro Kakitsuka, Kanagawa (JP); Toshikazu Fujii, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 421 days.

(21) Appl. No.: 10/369,502

(22) Filed: Feb. 21, 2003

(65) Prior Publication Data

US 2003/0179666 A1 Sep. 25, 2003

(30) Foreign Application Priority Data

Feb. 21, 2002 (JP) .......................... P2002-045485

(51) Int. Cl.
*G11B 7/095* (2006.01)
(52) U.S. Cl. ................................. 369/44.34; 369/44.36
(58) Field of Classification Search ............ 369/44.34, 369/44.36, 44.27, 53.2, 275.4, 47.21
See application file for complete search history.

(56) References Cited

U.S. PATENT DOCUMENTS

| 5,638,354 | A | * | 6/1997 | Nakayama et al. ...... 369/275.3 |
| 5,978,327 | A | * | 11/1999 | Kuroda et al. ........... 369/44.26 |
| 6,456,574 | B1 | * | 9/2002 | Kato ....................... 369/47.21 |

FOREIGN PATENT DOCUMENTS

| JP | 9-17029 | 1/1997 |
| JP | 2000-113463 | 4/2000 |
| JP | 2001291256 A | * 10/2001 |

* cited by examiner

*Primary Examiner*—William J Klimowicz
(74) *Attorney, Agent, or Firm*—Oblon, Spivak, McClelland, Maier & Neustadt, P.C.

(57) ABSTRACT

A recording and playback apparatus comprises, a drive unit configured to rotate an optical recording medium including a recording track, a recording and playback unit configured to irradiate a light beam on the recording track, and to perform recording and playback of an information detected a reflected light beam by an upside photo detection area and a downside photo detection area bisected in a tangential direction of the recording track, and a recording and playback controller configured to generate a position tracking signal based on the reflected light beam detected by the upside photo detection area and the downside photo detection area, and to compensate a level of the position tracking signal when the position tracking signal and a record mark on the recording track are detected.

17 Claims, 22 Drawing Sheets

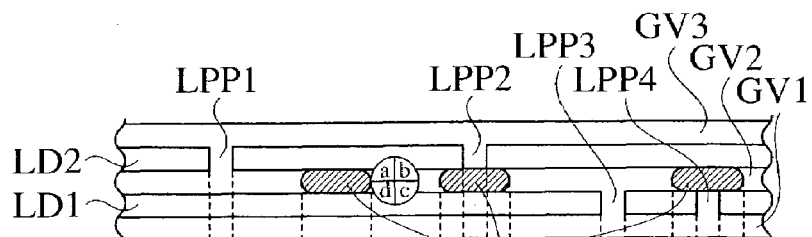
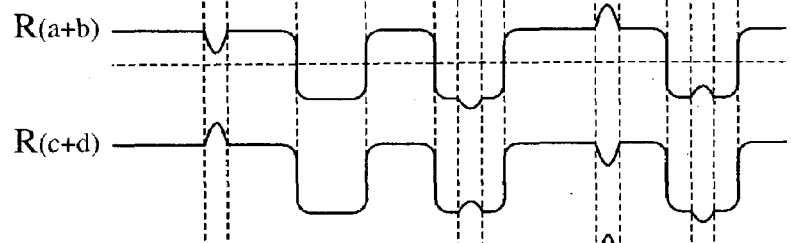
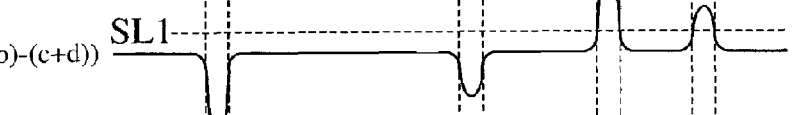
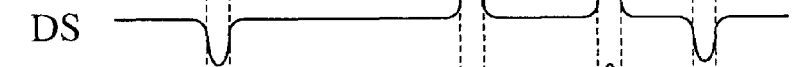
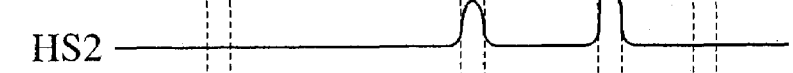
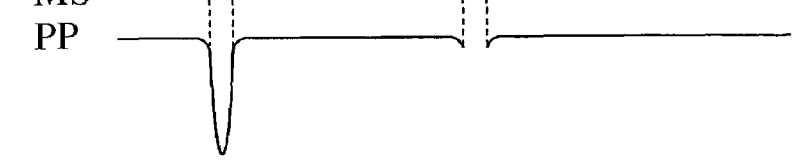

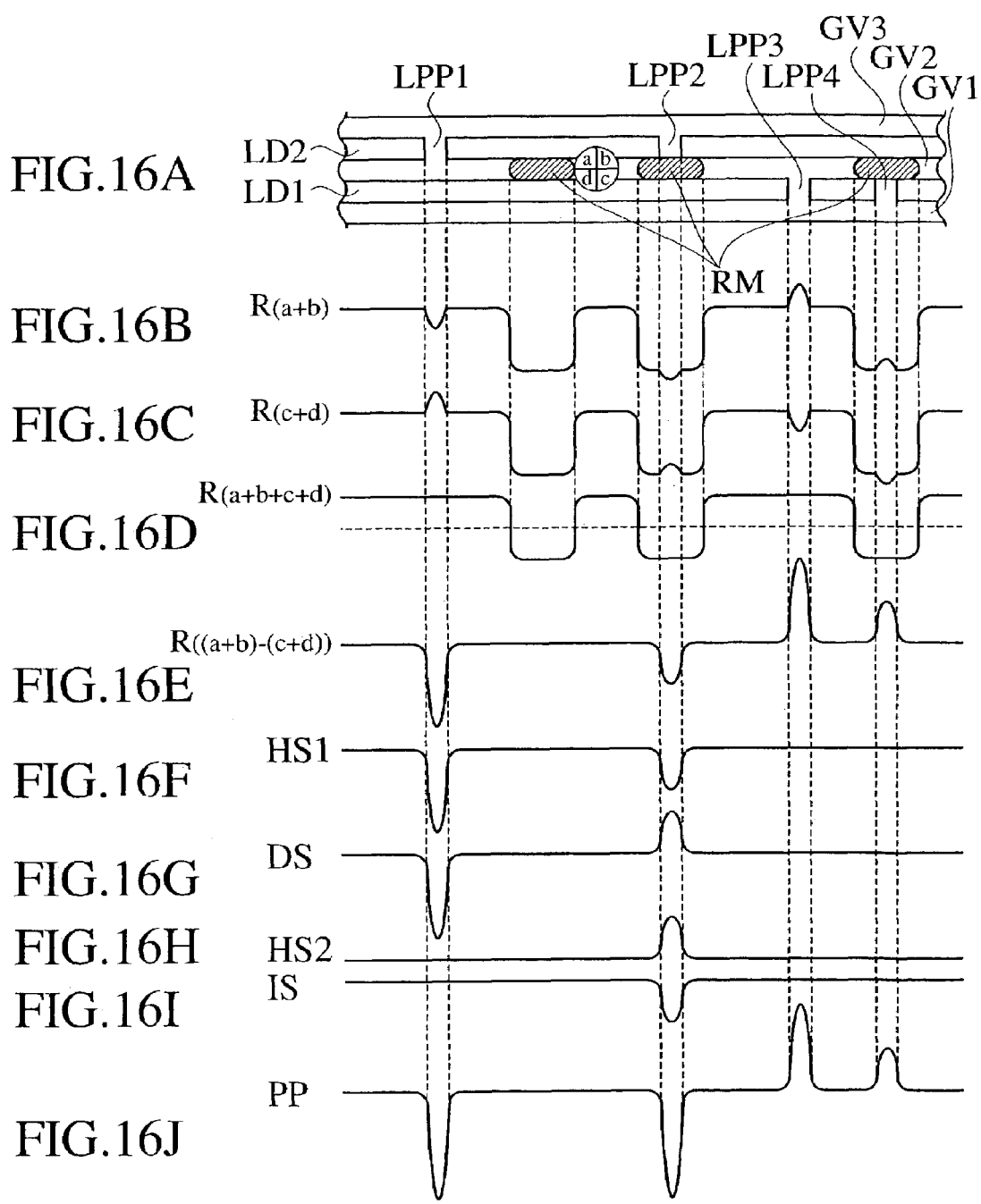

TIME($\mu$ sec)

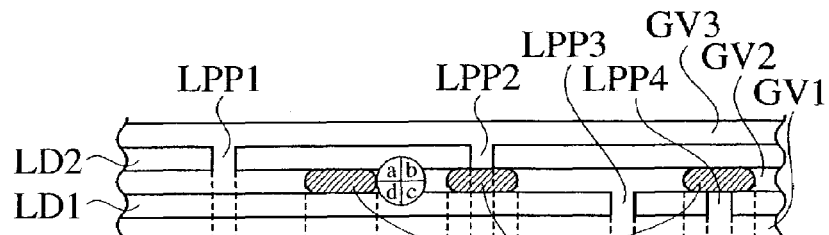
FIG. 20A
FIG. 20B
FIG. 20C
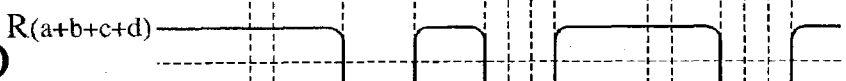
FIG. 20D
FIG. 20E
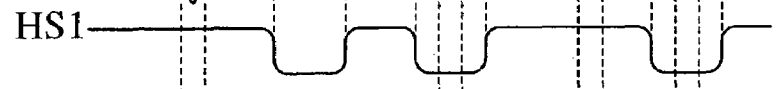
FIG. 20F
FIG. 20G
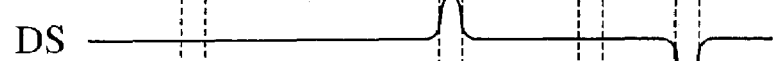
FIG. 20H
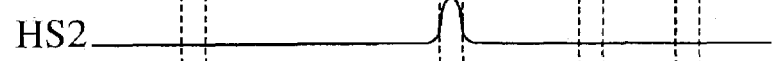
FIG. 20I
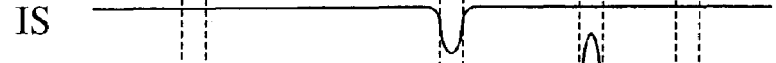
FIG. 20J

PRE-PIT SIGNAL GENERATOR COMPENSATING A PRE-PIT SIGNAL DAMPED, SEMICONDUCTOR INTEGRATED CIRCUIT, RECORDING AND PLAYBACK APPARATUS, AND PRE-PIT SIGNAL GENERATION METHOD

CROSS REFERENCE TO RELATED APPLICATIONS

This application is based upon and claims the benefit of priority from the prior Japanese Patent Applications No. P2002-045485, filed on Feb. 21, 2002; the entire contents of which are incorporated herein by reference.

BACKGROUND OF THE INVENTION

1. Field of the Invention

The present invention relates to an optical recording and playback apparatus, and more particularly, to a pre-pit signal generator, a semiconductor integrated circuit, and a pre-pit signal generation method.

2. Description of the Related Art

As an optical recording media, a recordable digital versatile disc (DVD-R) and a rewritable digital versatile disc (DVD-RW) are known. An optical recording and playback apparatus generates record marks on a groove track during recording, and reads the record marks during playback. When information is recorded to or played back from such an optical recording medium, a pre-pit signal generator detects a land pre-pit on the optical recording medium as position information by use of reflected light of a recording beam irradiated onto the optical recording medium.

The optical recording and playback apparatus detecting a radial upper signal and a radial lower signal bisected in a tangential direction of a recording track on the optical recording medium is known. The pre-pit signal generator provides a radial push-pull signal obtained by subtracting the radial lower signal from the radial upper signal (hereinafter referred to as a "first related art").

However, in the pre-pit signal generator according to the first prior art, amount of a reflected light of the land pre-pit is reduced when record mark portions and the land pre-pits on the optical recording medium become adjacent to each other. If the amount of the reflected light is reduced, then a binarizable range of a radial push-pull signal is narrowed. Moreover, because information components of an adjacent track leak to the radial push-pull signal, there has been a problem that the signal becomes unbalanced due to tracking errors of information reading spots.

To solve the above-described problem, the pre-pit signal generator using the radial upper signal amplified by k1 and the radial lower signal amplified by k2 (hereinafter referred to as a "second related art") has been proposed. (refer to Japanese Patent Application Laid-open 2001-23168). The pre-pit signal generator generates radial push-pull signal obtained by subtracting the radial lower signals amplified by k2 from the radial upper signals amplified by k1. If the gain k1 is set larger than the gain k2, the binarizable range of the radial push-pull signals is expanded.

However, the pre-pit signal generator disclosed in the second related art unbalances an amplification ratio of the radial upper signals to the radial lower signals. The unbalance of the amplification ratio leaves in-phase components to be canceled on subtraction in the radial push-pull signals. High-frequency noise included in the radial push-pull signals becomes louder. The land pre-pit detection performance of the pre-pit signal generator is improved when there are record marks in the groove track adjacent to the land pre-pits. Specifically, there is a problem that the land pre-pit detection performance is deteriorated when there are no record marks.

SUMMARY OF THE INVENTION

In a first aspect of the present invention, a recording and playback apparatus encompasses, a drive unit configured to rotate an optical recording medium including a recording track, a recording and playback unit configured to irradiate a light beam on the recording track, and to record and play back of an information simultaneously, to detected a reflected light beam by an upside photo detection area and a downside photo detection area bisected in a tangential direction of the recording track, and a recording and playback controller configured to generate a position tracking signal based on the reflected light beam detected by the upside photo detection area and the downside photo detection area, and to compensate a level of the position tracking signal when the position tracking signal and a record mark on the recording track are detected.

In a second aspect of the present invention, a pre-pit signal generator embraces, a push-pull signal generator configured to subtract a radial lower signal received by a downside photo detection area partitioned in a tangential direction of a recording track of an optical recording medium from a radial upper signal received by an upside photo detection area partitioned in the tangential direction, and to generate a radial push-pull signal detecting a position of a land pre-pit, a compensation signal generator configured to generate a compensation signal when a record mark on the recording track and the land pre-pit are adjacent to each other, and a compensation signal adder configured to add together the radial push-pull signal and the compensation signal.

In a third aspect of the present invention, a semiconductor integrated circuit comprises, a semiconductor chip, a pre-pit signal generator integrated on the semiconductor chip configured to subtract a radial lower signal received by a downside photo detection area partitioned in a tangential direction of a recording track of an optical recording medium from a radial upper signal received by an upside photo detection area partitioned in the tangential direction, and to generate a radial push-pull signal detecting a position of a land pre-pit when a record mark on the recording track and a land pre-pit are adjacent to each other, a recording circuit integrated on the semiconductor chip configured to recognize position information of the recording track in accordance with the pre-pit signal, a servo controller integrated on the semiconductor chip configured to control a position of a recording and playback head in accordance with the position information of the recording track, a playback circuit integrated on the semiconductor chip configured to receive a reading and playback signal and outputting playback information data to the recording and playback head.

In a fourth aspect of the present invention, a pre-pit signal generation method encompasses, receiving a reflected light beam from an optical recording medium by photo detection areas bisected in a tangential direction of a recording track of the optical recording medium, generating a radial upper signal from a light beam received by the photo detection area on an upside in the tangential direction, generating an added radial lower signal from a light beam received by the photo detection area on a downside in the tangential direction, subtracting the radial lower signal from the radial upper signal to generate a radial push-pull signal, generating a compensation signal of the radial push-pull signal at a position of a record mark on the recording track by using the radial push-pull signal and the radial upper signal, and adding the compensation signal to the radial push-pull signal.

BRIEF DESCRIPTION OF DRAWINGS

FIGS. 14A to 14J are timing charts of the pre-pit signal generator according to the third embodiment of the present invention.

FIGS. 16A to 16J are timing charts of the pre-pit signal generator according to the fourth embodiment of the present invention.

FIGS. 20A to 20J are timing charts of the pre-pit signal generator according to the fifth embodiment of the present invention.

DETAILED DESCRIPTION OF THE INVENTION

Figure 1:
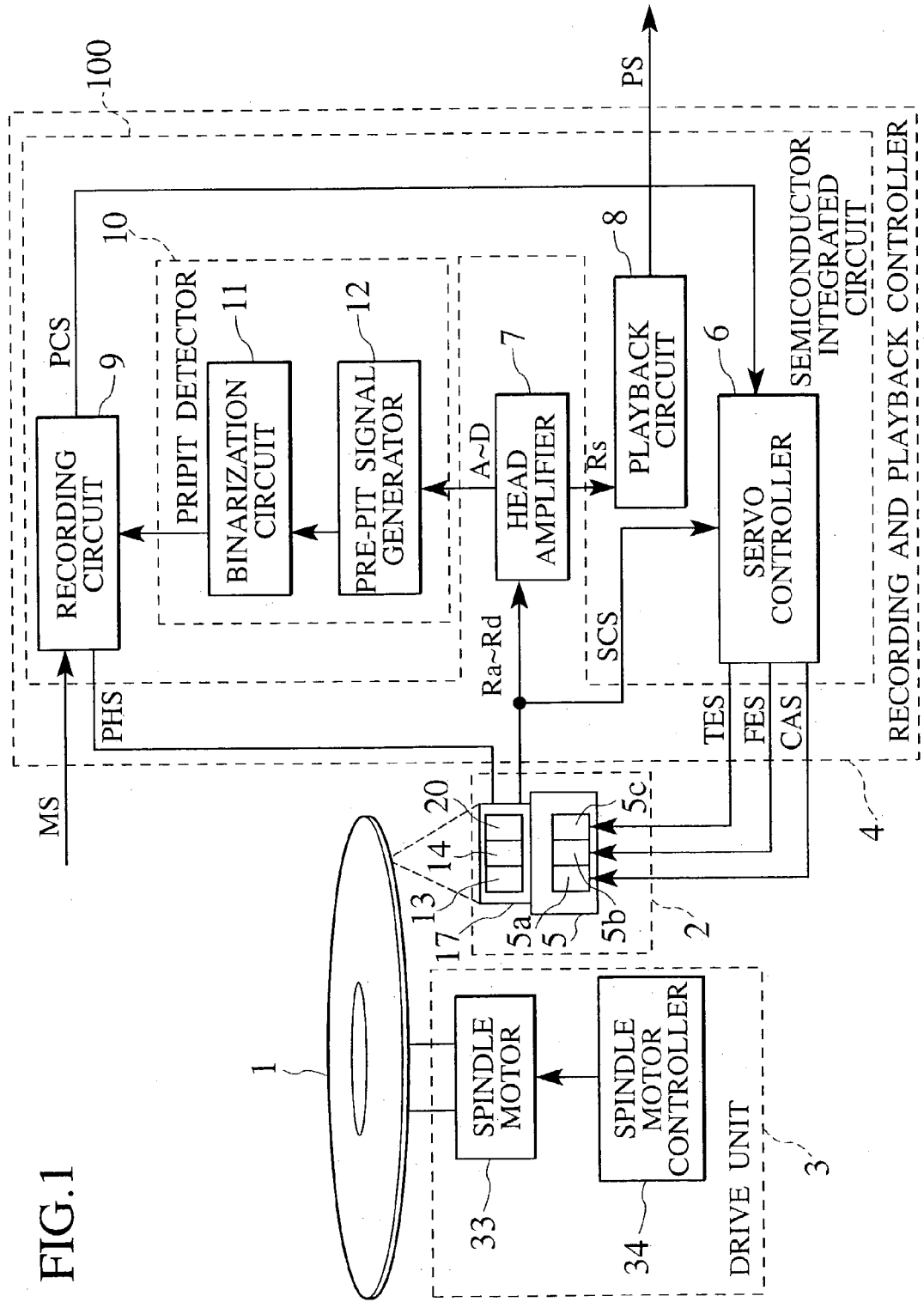
FIG. 1 is a diagram explaining a recording and playback apparatus according to first to sixth embodiments of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

As shown in FIG. 1, a recording and playback apparatus-using the pre-pit signal generator 12 according to the first to sixth embodiments of the present invention encompasses, a drive unit 3 configured to rotate an optical recording medium 1 including a recording track, a recording and playback unit 2 configured to irradiate a light beam on the recording track, and to record and play back an information detected a reflected light beam by an upside photo detection area and a downside photo detection area bisected in a tangential direction of the recording track simultaneously, and the recording and playback controller 4 configured to generate a position tracking signal based on the reflected light beam detected by the upside photo detection area and the downside photo detection area, and to compensate a level of the position tracking signal when the position tracking signal and a record mark on the recording track are detected.

The recording and playback apparatus will be schematically described on the premise that the recording track is a groove track and the position information is a land pre-pit. Moreover, the apparatus will be described on the premise that signals detected by the upper and downside photo detection areas bisected in the tangential direction of the recording track are a radial upper signal and a radial lower signal respectively.

The recording and playback controller 4 includes a head amplifier 7 connected to an output side of the recording and playback unit 2, a playback circuit 8 connected to a first output side of the head amplifier 7, a pre-pit detector 10 connected to a second output side of the head amplifier 7, a recording circuit 9 connected to an output side of the pre-pit detector 10, and a servo controller 6 connected to an output sides of the recording circuit 9 and the recording and playback unit 2 individually. The pre-pit detector 10 includes the pre-pit signal generator 12 connected to the output side of the head amplifier 7, and a binarization circuit 11 connected to an output side of the pre-pit signal generator 12. The drive unit 3 includes the spindle motor 33, and the spindle motor controller 34 connected to an input side of the spindle motor 33.

The recording and playback unit 2 includes a recording and playback head 17, and a head driver 5 disposed at a position adjacent to the recording and playback head 17. The recording and playback head 17 includes a recording light beam generator 13, a reading light beam generator 14 disposed at a position adjacent to the recording light beam generator 13, and a quad detector 20 disposed at a position adjacent to the reading light beam generator 14. The recording light beam generator 13 and the reading light beam generator 14 may use, for example, semiconductor lasers. Moreover, the recording and reading light beam generators 13 and 14 may be, for example, one light beam generator configured to generate a recording light beam and a reading light beam, and a light beam generator two semiconductor lasers are integrated in one chip, or the like.

The quad detector 20 is defined as a photoelectric conversion device having photo detection areas quartered in the tangential and vertical directions of the groove track. For example, it is sufficient if the quad detector 20 may have an integrated structure functioning as four independent photodiodes. The quad detector 20 may replace by a dual detector bisected in the tangential direction of the groove track.

The head driver 5 includes a course actuator 5a, a focus actuator 5b, and a tracking actuator 5c.

Figure 2A:
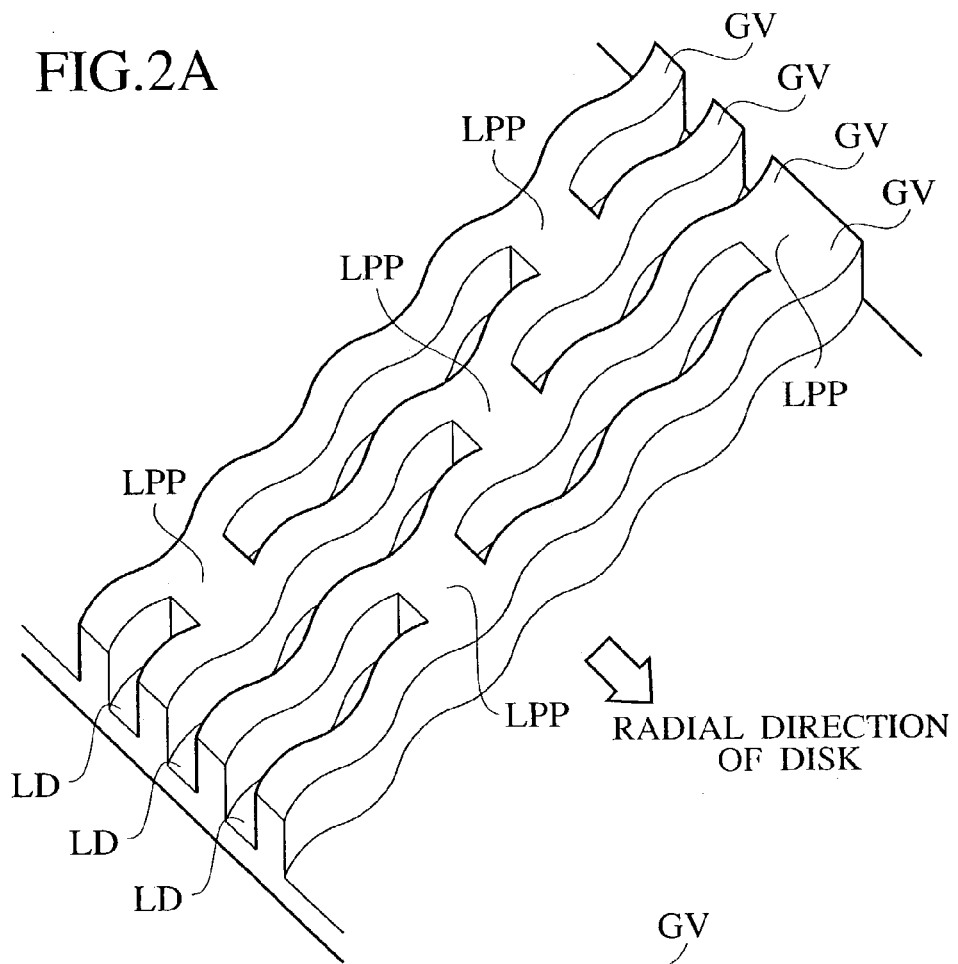
FIG. 2A is a view explaining a part of a recording surface having a wobble shape in an optical recording medium.

Next, the operation of the recording and playback apparatus using the pre-pit signal generator 12 according to the first to sixth embodiments will be described with reference to FIG. 1. Note that the operation will be described for each of the cases of recording information in the optical recording medium 1 and playing back the information recorded in the optical recording medium 1. The optical recording medium 1 will be schematically described on the premise that it includes the groove tracks GV, the land tracks LD and the land pre-pits LPP as shown in FIG. 2A. Moreover, the optical recording media 1 shown in FIGS. 2A and 2B will be described on the premise that a laser-irradiated surface is an upside thereof and a printing surface of the disk is a downside thereof.

Figure 2B:
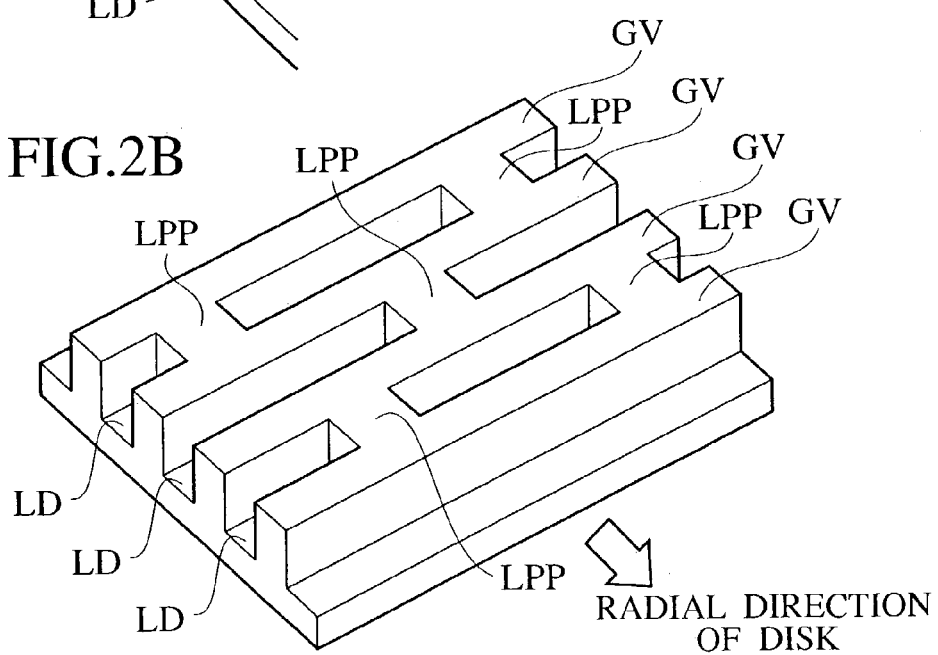
FIG. 2B is a view explaining a part of a recording surface in the optical recording medium.

The groove tracks GV are arranged alternately in a spiral or concentric circular shape and have a concave shape seen from the disk printing surface side. The land tracks LD have the convex shape seen from the disk printing surface side. Note that, here, description will be schematically made on the premise that the groove tracks GV have a convex shape seen from the upside of the disk, and that the land tracks LD disposed at positions adjacent to the groove tracks GV have a convex shape seen from the upside of the disk. The land pre-pits LPP are pits of the land disposed on the land tracks LD where each coupling two groove tracks GV are adjacent to each other. The land pre-pits LPP has a convex shape seen from the upside of the disk. As shown in FIG. 2A, the optical recording medium 1 having wobbles. The groove tracks GV meander in the radius direction of the disk. The wobbles are provided in order to obtain signals in synchronization with the rotation of the disk. For simplicity, the following description will be made ignoring the wobbles as shown in FIG. 2B.

Figure 3:
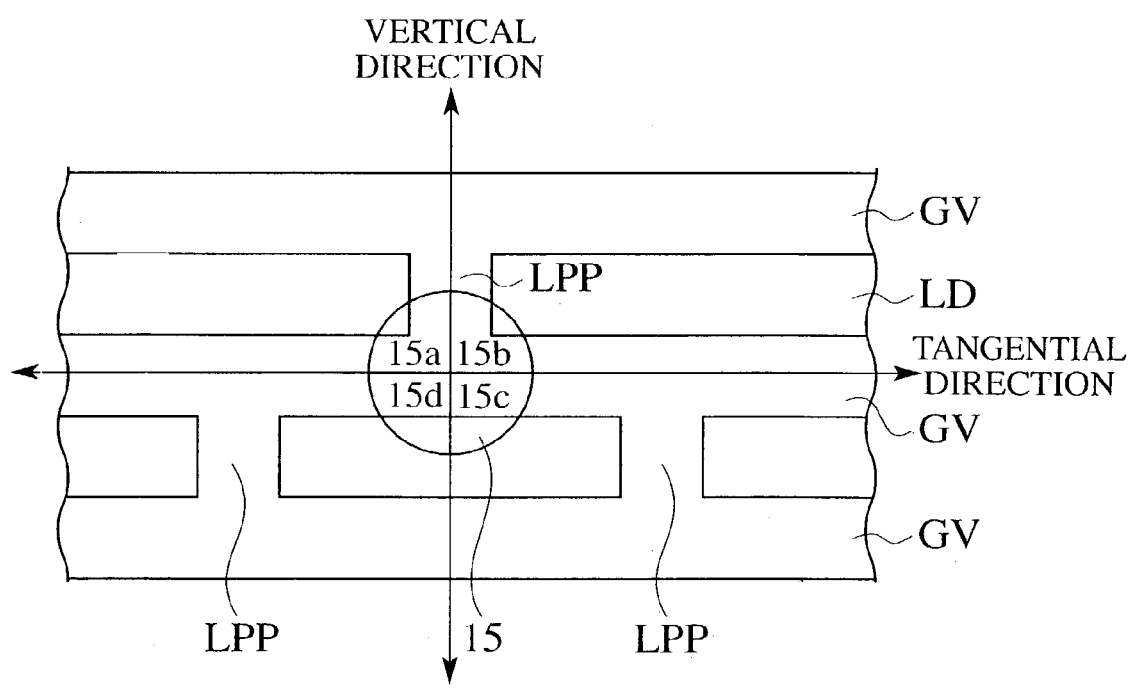
FIG. 3 is a diagram explaining a light beam spot formed on the recording surface of the optical recording medium.

Case of Recording Information in Optical Recording Medium 1:

(A) First, a record information MS is transmitted to the input side of the recording circuit 9. The reading light beam generator 14 irradiates the reading light beam onto the optical recording medium 1 rotated by the spindle motor 33. As shown in FIG. 3, the quad detector 20 generates the photo detection signals Ra to Rd in accordance with the reflected light by the spots 15a to 15d obtained by partitioning an information reading spot 15.

(B) The head amplifier 7 generates an amplification signals A to D and a spindle motor control signal SCS from the photo detection signals Ra to Rd. The spindle motor controller 34 receives the spindle motor control signal SCS and controls the rotation speed of the spindle motor 33. The pre-pit detector 10 generates a pre-pit signal PP by use of the amplification signals A to D and outputs a pre-pit detection signal PPD obtained by binarizing the pre-pit signal PP. The recording circuit 9 generates a position control signal PSC in accordance with the pre-pit detection signal PPD. Note that the recording circuit 9 may directly receive the output of the pre-pit signal generator 12 and may perform the pre-pit detection. For example, the recording circuit 9 may capture the pre-pit signal PP after A/D conversion and may perform the pre-pit detection by digital processing.

(C) The servo controller 6 generates a course actuator control signal CAS, a focus error signal FES and a tracking error signal TES based on the position control signal PSC and the photo detection signals Ra to Rd. The course actuator control signal CAS is supplied to the course actuator 5a, and thus the recording and playback head 17 is moved in the disk radius direction at a speed in accordance with the course actuator control signal CAS. The focus error signal FES is supplied to the focus actuator 5b and adjusts a focal point of the information reading spot 15 as shown in FIG. 3. The tracking error signal TES is supplied to the tracking actuator 5c and adjusts the forming position of the information reading spot 15 in the disk radius direction.

(D) The recording light beam generator 13 irradiates a recording light beam in accordance with a recording modulation data signal PHS transmitted from the recording circuit 9 onto the groove track GV on the optical recording medium 1. In this case, heat is transmitted to an area on the groove track GV by the irradiated the recording beam, where a record mark RM is then formed.

Case of Playing Back Information Recorded in Optical Recording Medium 1:

(A) First, the reading light beam generator 14 irradiates the reading light beam onto the optical recording medium 1 rotated by the spindle motor 33. As shown in FIG. 3, the quad detector 20 generates the photo detection signals Ra to Rd in accordance with reflected light of the spots 15a to 15d obtained by partitioning the information reading spot 15.

(B) The head amplifier 7 generates the amplification signals A to D, the spindle motor control signal SCS and the read signal RS from the photo detection signals Ra to Rd. The spindle motor controller 34 receives the spindle motor control signal SCS and controls the rotation speed of the spindle motor 33. The pre-pit detector 10 generates the pre-pit signal PP by use of the amplification signals A to D and outputs the pre-pit detection signal PPD obtained by binarizing the pre-pit signal PP. The recording circuit 9 generates the position control signal PSC in accordance with the pre-pit detection signal PPD. Note that the recording circuit 9 may directly receive the output of the pre-pit signal generator 12 and may perform the pre-pit detection. For example, the recording circuit 9 may capture the pre-pit signal PP after A/D conversion and may perform the pre-pit detection by digital processing.

(C) The servo controller 6 generates the course actuator control signal CAS, the focus error signal FES and the tracking error signal TES based on the position control signal PSC and the photo detection signals Ra to Rd, which are transmitted thereto. The course actuator control signal CAS is supplied to the course actuator 5a, and thus the recording and playback head 17 is transferred to the disk radius direction at the speed in accordance with the course actuator control signal CAS. The focus error signal FES is supplied to the focus actuator 5b and adjusts the focal point of the information reading spot 15 as shown in FIG. 3. The tracking error signal TES is supplied to the tracking actuator 5c and adjusts the forming position of the information reading spot 15 in the disk radius direction.

(D) The playback circuit 8 generates a playback information data PS such as video data, audio data and a program from the read signal RS transmitted thereto. For example, the playback circuit 8 carries out processing such as binary, demodulation, error compensation, information decoding.

The recording and playback apparatus of the present invention enables to realize accurate pre-pit detection performance whether the record mark RM exists on the groove track GV adjacent to the land pre-pit LPP or not.

Figure 4:
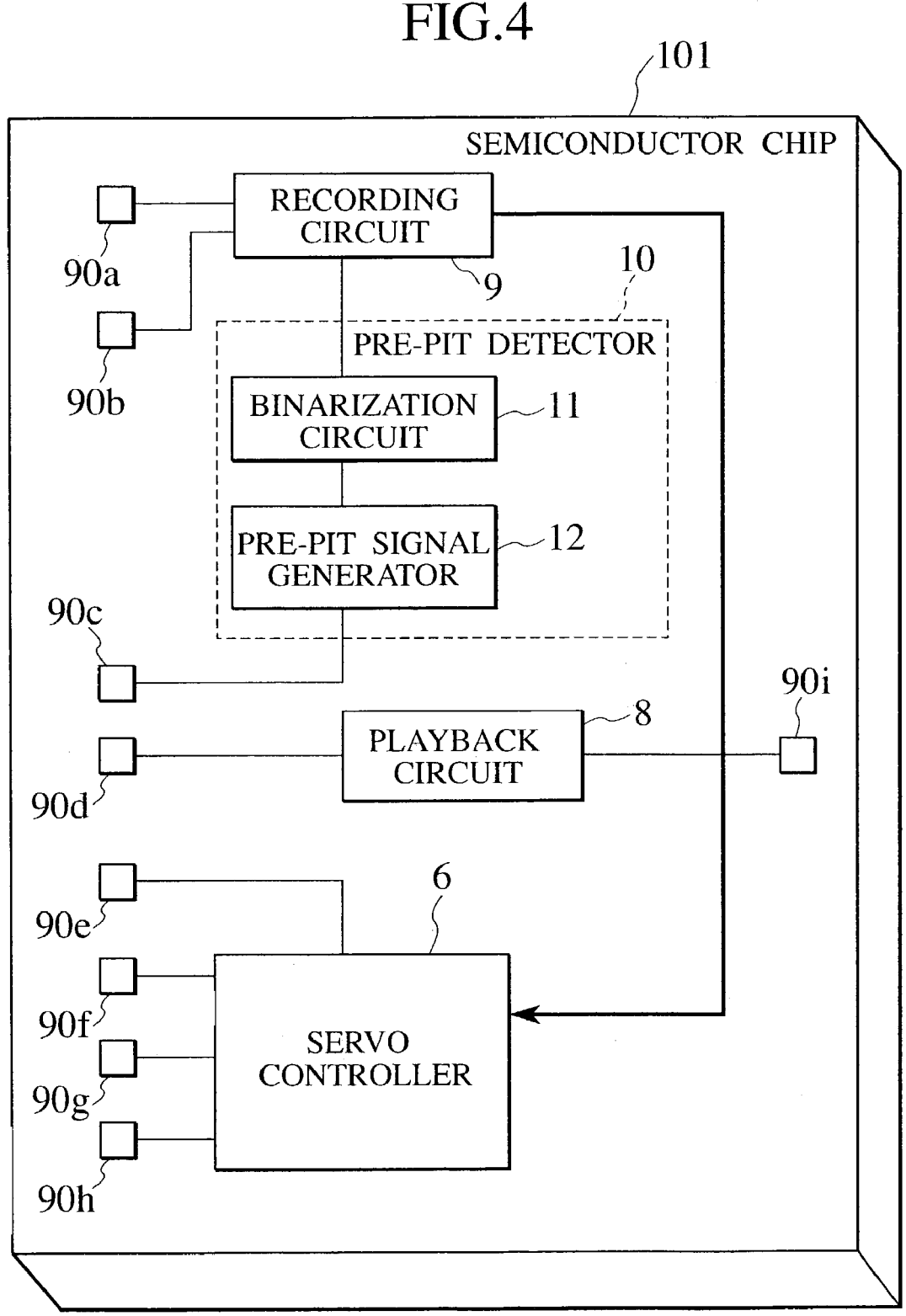
FIG. 4 is a diagram explaining a semiconductor integration circuit according to a first embodiment of the present invention.

A part of the recording and playback apparatus embracing an auxiliary circuit 12 according to the first to sixth embodiment of the present invention can be monolithically integrated so as to form the semiconductor integrated circuit 100 on the same semiconductor chip as shown in FIG. 4.

In this case, the case where the recording circuit 9, the servo controller 6, the playback circuit 8, the pre-pit signal generator 12 and the binarization circuit 11 are formed on the semiconductor chip 101.

The bonding pads 90a to 90i are further arranged on the semiconductor chip 101. The bonding pad 90a is an internal terminal receiving the record information MS and is electrically connected to the recording circuit 9. The bonding pad 90b is an internal terminal transmitting the recording modulation data signal PHS and is electrically connected to the recording circuit 9. The bonding pad 90c is an internal terminal for receiving the signals A to D transmitted from the head amplifier 7 and is electrically connected to the pre-pit signal generator 12. The bonding pad 90d is an internal terminal receiving the read signal RS and is electrically connected to the playback circuit 8. The bonding pad 90e is an internal terminal receiving the photo detection signals Ra to Rd and is electrically connected to the servo controller 6. The bonding pads 90f to 90h are internal terminals outputting the course actuator control signal CAS, the focus error signal FES and the tracking error signal TES and are electrically connected to the servo controller 6. The bonding pad 90i is an internal terminal outputting the playback information data PS and is electrically connected to the playback circuit 8. The pre-pit signal input terminal of the recording circuit 9 is connected to the output terminal of the binarization circuit 11. The input terminal of the binarization circuit 11 is connected to the output terminal of the pre-pit signal generator 12. The control signal output port of the recording circuit 9 is connected to the control signal input port of the servo controller 6.

The semiconductor chip 101 shown in FIG. 4 is implemented by known CMOS process. To put it concretely, the bonding pads 90a to 90i are connected to, for example, a plurality of high impurity concentration regions (source region/ drain region) formed in and at the surfaces of active areas assigned at the surface of the semiconductor chip 101, where a donor or an acceptor is doped with a concentration of approximately $1\times10^{18}$ to $1\times10^{21}$ cm$^{-3}$. A plurality of electrode layers made from a metal such as aluminum (Al) or an aluminum alloy (Al—Si, Al—Cu—Si) are formed so as to implement ohmic contacts with this plurality of high impurity concentration regions. On the top surface of such a plurality of electrode layers, a passivation film such as an oxide film (SiO$_2$), a phosphosilicate glass (PSG) film, a boro-phosphosilicate glass (BPSG) film, a nitride film (Si$_3$N$_4$), or a polyimide film, is deposited.

A plurality of openings (contact holes) are delineated in a portion of the passivation film so as to expose a plurality of electrode layers, implementing the bonding pads 90a to 90i. Alternatively, the bonding pads 90a to 90i may be formed as other metal patterns connected to a plurality of electrode layers by using metal wiring. In addition, it is possible to form bonding pads 90a to 90i on the polysilicon gate electrodes using a metal film such as aluminum (Al) or an aluminum alloy (Al—Si, Al—Cu—Si). Alternatively, a plurality of other bonding pads may be connected to the polysilicon gate electrodes, via a plurality of signal lines such as gate wirings. Instead of polysilicon, gate electrodes made of a refractory metal such as tungsten (W), titanium (Ti), or molybdenum (Mo), a silicide (i.e. WSi$_2$, TiSi$_2$, MoSi$_2$), or a polycide containing any of these silicides can be used.

FIRST EMBODIMENT

Figure 5:
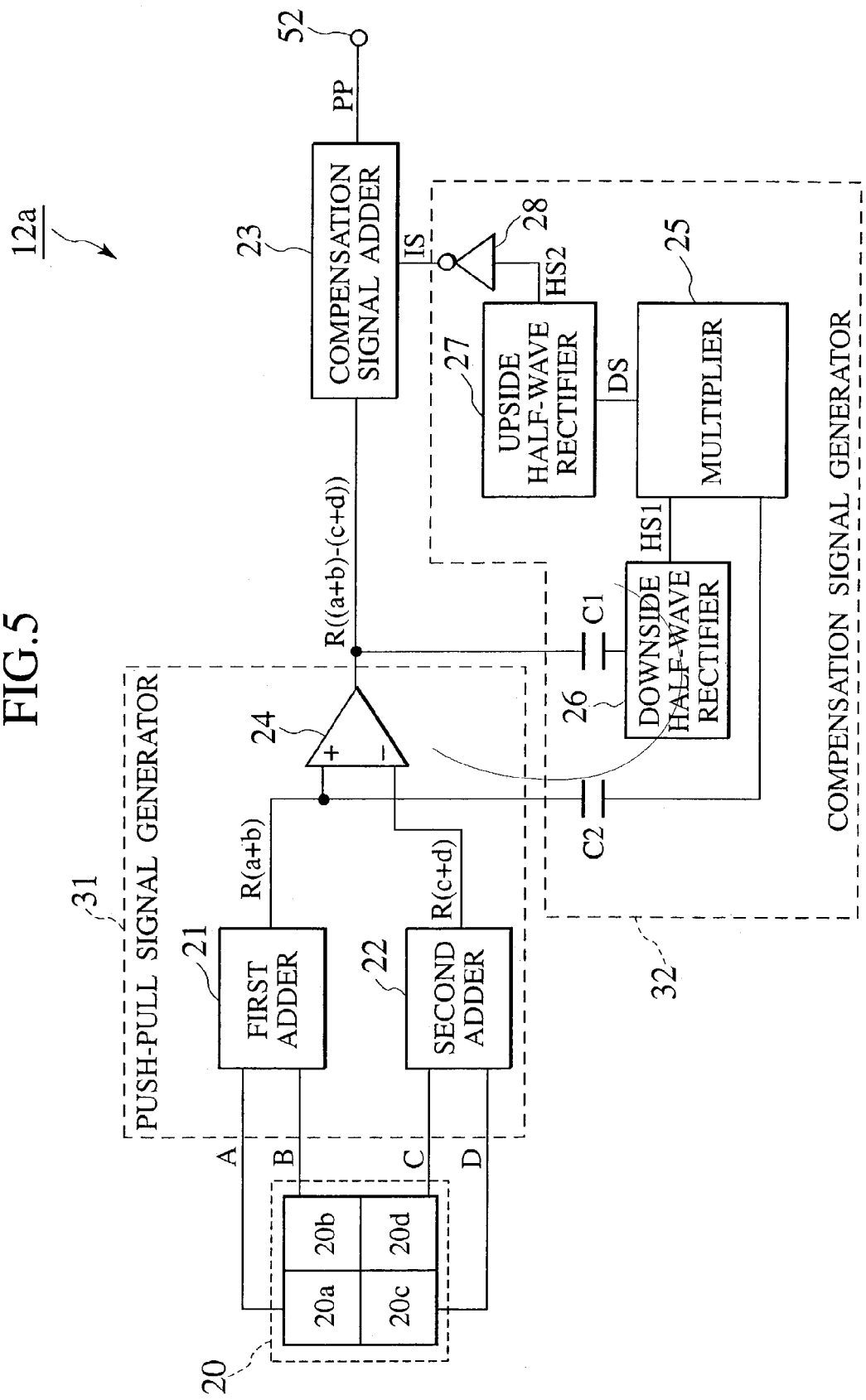
FIG. 5 is a diagram explaining a pre-pit signal generator according to the first embodiment of the present invention.

As shown in FIG. 5, the pre-pit signal generator 12a according to the first embodiment of the present invention encompasses, a push-pull signal generator 31, a compensation signal generator 32, and a compensation signal adder 23. The push-pull signal generator 31 generates the radial push-pull signal R((a+b)−(c+d)) obtained by subtracting the radial lower signal R(c+d) from the radial upper signal R(a+b). The radial lower signal R(c+d) is obtained by adding together the two respective signals C and D received by the two photo detection areas 20c and 20d on the downside of the recording track in the tangential direction. The radial upper signal R(a+b) is obtained by adding together the two respective signals A and B received by the two photo detection areas 20a and 20b on the upside of the recording track in the tangential direction. The compensation signal generator 32 generates a compensation signal at a peak position of the radial push-pull signal R((a+b)−(c+d)) in the case where there is a record mark on a recording track adjacent to the pre-pit by use of the radial push-pull signal and the radial upper signal R(a+b). The compensation signal adder 23 adds together the radial upper signal R(a+b) and the compensation signal.

The push-pull signal generator 31 includes a first adder 21 having a first input terminal receiving a detection signal A in accordance with the reflected light of a photo detection area 20a and a second input terminal receiving a detection signal B in accordance with the reflected light of a photo detection area 20b, a second adder 22 having a first input terminal receiving a detection signal C in accordance with the reflected light of a photo detection area 20c and a second input terminal receiving a detection signal D in accordance with the reflected light of the photo detection area 20d, and a subtractor 24 having a positive input terminal connected to an output terminal of the first adder 21 and a negative input terminal connected to an output terminal of the second adder 22.

The compensation signal generator 32 includes a first capacitor C1 connected to an output side of the push-pull signal generator 31, a first half-wave rectifier 26 of which own input side is connected to an other end of the first capacitor C1, a second capacitor C2 connected to the output side of the first adder 21, a multiplier 25 connected to the output side of the first half-wave rectifier 26 and an output side of the second capacitor C2 to an input terminal thereof;

a second half-wave rectifier 27 connected to an output of the multiplier 25; a inverter 28 connected to an output side of the second half-wave rectifier 27; and an compensation signal adder 23 connecting an output of the inverter 28 and the output of the subtractor 24 to an input terminal thereof.

Note that, the inserting position of the inverter 28 is not limited to this position, though the inverter 28 is connected between the output terminal of the second half-wave rectifier 27 and the first input terminal of the compensation signal adder 23 as shown in FIG. 5, For example, the inverter 28 may be inserted between the output terminal of the first adder 21 and the second capacitor C2, between the second capacitor C2 and the second input terminal of the multiplier 25, between the first capacitor C1 and the input terminal of the first half-wave rectifier 26, between the output terminal of the first half-wave rectifier 26 and the first input terminal of the multiplier 25, and between the output terminal of the multiplier 25 and the input terminal of the second half-wave rectifier 27.

Moreover, the first and second capacitors C1 and C2 may not be used. The first and second capacitors C1 and C2 reduce noise by removing DC component. Furthermore, when a DC component of a signal inputted to the multiplier 25 is removed, an offset of a DC component of the compensation signal output is reduced. Hence, it is better to insert the first and second capacitors C1 and C2. The first capacitor C1 may be inserted between the output terminal of the first half-wave rectifier 26 and the first input terminal of the multiplier 25. Moreover, the first and second capacitors C1 and C2 may be removed, and capacitor may be inserted into the inputs of the first and second adders 21 and 22 one by one, respectively. Alternatively, capacitor may be inserted into the outputs of the first and second adders 21 and 22, respectively.

Figure 6:
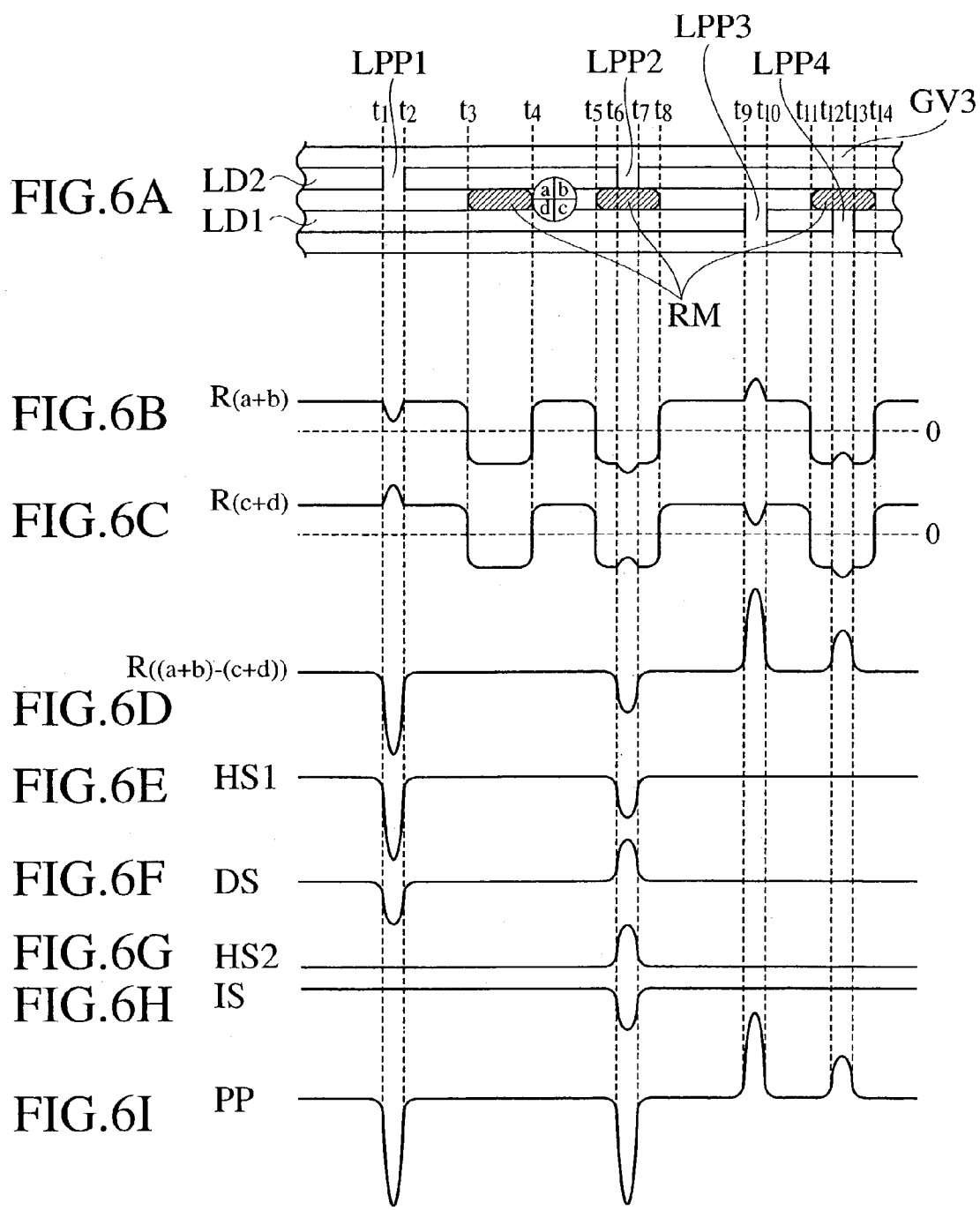
FIGS. 6A to 6I are timing charts of the pre-pit signal generator according to the first embodiment of the present invention.

The operation of the pre-pit signal generator 12a illustrated in FIG. 5 will be described with reference to FIG. 6. The description will be schematically made on the premise that the recording and playback unit 2 moves on the groove track GV2 of the after recorded optical recording medium 1 shown in FIG. 6A while irradiating a light beam into the groove track GV2.

(A) During a period from the time t1 to the time t2, the recording and playback unit 2 reads the land pre-pit LPP1 provided as an end of a concave pit. The land pre-pit LPP1 is located on the groove track GV2 provided as a convex portion, and the record mark RM does not exist in the vicinity thereof As shown in FIG. 6B, the first adder 21 adds together the signal A and the signal B to generate the radial upper signal R(a+b). The second adder 22 adds together the signal C and signal D to generate the radial lower signal R(c+d) as shown in FIG. 6C. The subtractor 24 subtracts the radial lower signal R(c+d) from the radial upper signal R(a+b) to generate the radial push-pull signal R((a+b)−(c+d)) as shown in FIG. 6D. As shown in FIG. 6E, the radial push-pull signal R((a+b)−(c+d)) is half-wave rectified by the first half-wave rectifier 26. As shown in FIG. 6F, a multiplication signal DS has a negative peak. As shown in FIG. 6I, the pre-pit signal added the radial push-pull signal R((a+b)−(c+d)) and compensation signal DS by the compensation signal adder 23.

(B) During a period from the time t3 to the time t4, the recording and playback unit 2 reads the record mark RM while progressing from the land pre-pit LPP1 toward the land pre-pit LPP2. As shown in FIG. 6B, the first adder 21 adds together the signal A and the signal B to generate the radial upper signal R(a+b). The read signals of the photo detection areas 20a and 20b of the quad detector 20 are reduced in the portion of the record mark RM. As shown in FIG. 6C, the second adder 22 adds together the signal C and the signal D to generate the radial lower signal R(c+d). The read signals of the photo detection areas 20c and 20d of the quad detector 20 are reduced in the portion of the record mark RM. Because there is no difference in level between the radial upper signal R(a+b) and the radial lower signal R(c+d), the output signal of the subtractor 24 is not changed as shown in FIG. 6D.

(C) During a period from the time t5 to t6, the recording and playback unit 2 reads the record mark RM while progressing toward the land pre-pit LPP2. In this case, the first and second adders 21 and 22 operate similarly to the case during the period from the time t3 to the time t4.

(D) During a period from the time t6 to t7, the recording and playback unit 2 reads the land pre-pit LPP2. The land pre-pit LPP2 is located above the groove track GV2 to which the record mark RM is written. As shown in FIG. 6B, the radial upper signal R(a+b) transmitted from the first adder 21 is further reduced from the level shown during the period from the time t5 to the time t6. The radial lower signal R(c+d) transmitted from the second adder 22 is further gained from the level shown during the period from the time t5 to the time t6 as shown in FIG. 6C. The change of the radial push-pull signal R((a+b)−(c+d)) level transmitted from the subtractor 24 is less than the change of the signal level during the period from the time t1 to time t2 as shown in FIG. 6D. The multiplier 25 multiplies the radial upper signal R(a+b) representing a negative value and the radial push-pull signal R((a+b)−(c+d)) representing a negative value to output the signal DS changed to a positive side as shown in FIG. 6F. As shown in FIG. 6G, the second half-wave rectifier 27 passes the signal changed to the positive side therethrough. As shown in FIG. 6H, the inverter 28 outputs a signal obtained by inverting the output signal HS2 of the second half-wave rectifier 27. As shown in FIG. 6I, the compensation signal adder 23 adds the output signal IS of the inverter 28 to the radial push-pull signal R((a+b)−(c+d)).

(E) During a period from the time t7 to t8, the recording and playback unit 2 reads the record mark RM while progressing from the land pre-pit LPP2 toward the land pre-pit LPP3. In this case, the first and second adders 21 and 22 operate similarly to the case during the period from the time t3 to the time t4.

(F) During a period from the time t9 to t10, the recording and playback unit 2 reads the land pre-pit LPP3. The land pre-pit LPP3 is located below the groove track GV2, and the record mark RM does not exist in the vicinity thereof. As shown in FIG. 6B, the radial upper signal R(a+b) is gained. Moreover, the radial lower signal R(c+d) is reduced as shown in FIG. 6C. As shown in FIG. 6D, the radial push-pull signal R((a+b)−(c+d)) is gained to the positive side. The first half-wave rectifier 26 rectifies the signal gained to the positive side. Specifically, as shown in FIG. 6I, the radial push-pull signal R((a+b)−(c+d)) is directly transmitted from the compensation signal adder 23 without generating a compensation signal to be added thereto.

(G) During a period from the time t10 to t12, the recording and playback unit 2 reads the record mark RM while progressing from the land pre-pit LPP3 toward the land pre-pit LPP4. In this case, the first and second adders 21 and 22 operate similarly to the case during the period from the time t3 to the time t4.

(H) During a period from the time t12 to t13, the recording and playback unit 2 reads the land pre-pit LPP4. The land pre-pit LPP4 is located below the groove track GV2 where the record mark RM is written. As shown in FIG. 6B, the radial upper signal R(a+b) transmitted from the first adder 21 is further gained from the level during the period from the time t10 to the time t11. The radial lower signal R(c+d) transmitted from the second adder 22 is further reduced from the level during the period from the time t10 to the time t11 as shown in FIG. 6C. As shown in FIG. 6D, the change of the radial push-pull signal R((a+b)−(c+d)) level transmitted from the subtractor 24 is less than the change of the signal level during the period from the time t9 to time t10. The first half-wave rectifier 26 rectifies the signal gained to the positive side. Specifically, as shown in FIG. 6I, the radial push-pull signal R((a+b)−(c+d)) is directly transmitted from the compensation signal adder 23 without generating the compensation signal to be added thereto.

(I) During a period from the time t13 to t14, the recording and playback unit 2 passes through the land pre-pit LPP4 and reads the record mark RM. In this case, the first and second adders 21 and 22 operate similarly to the case during the period from the time t3 to the time t4.

As shown in FIG. 6E, the first half-wave rectifier 26 can output the signal of which the positive peeks are removed by the half-wave rectification corresponding to the land pre-pits 3 and 4 not to be detected. The multiplier 25 multiplies the output signal of the first half-wave rectifier 26 and the signal obtained by removing the DC component from the radial upper signal R(a+b) through the second capacitor C2. As shown in FIG. 6F, the signal as a result of the multiplication has the negative peak at the position of the land pre-pit LPP1 to which the record mark is not adjacent and has the positive peak at the position of the land pre-pit LPP2 to which the record mark is adjacent. The compensation signal adder 23 adds together the compensation signal transmitted thereto from the inverter 28 and the radial push-pull signal R((a+b)−(c+d)) to generate the pre-pit signal PP at the position of the land pre-pit to be detected as shown in FIG. 6I.

Figure 7:
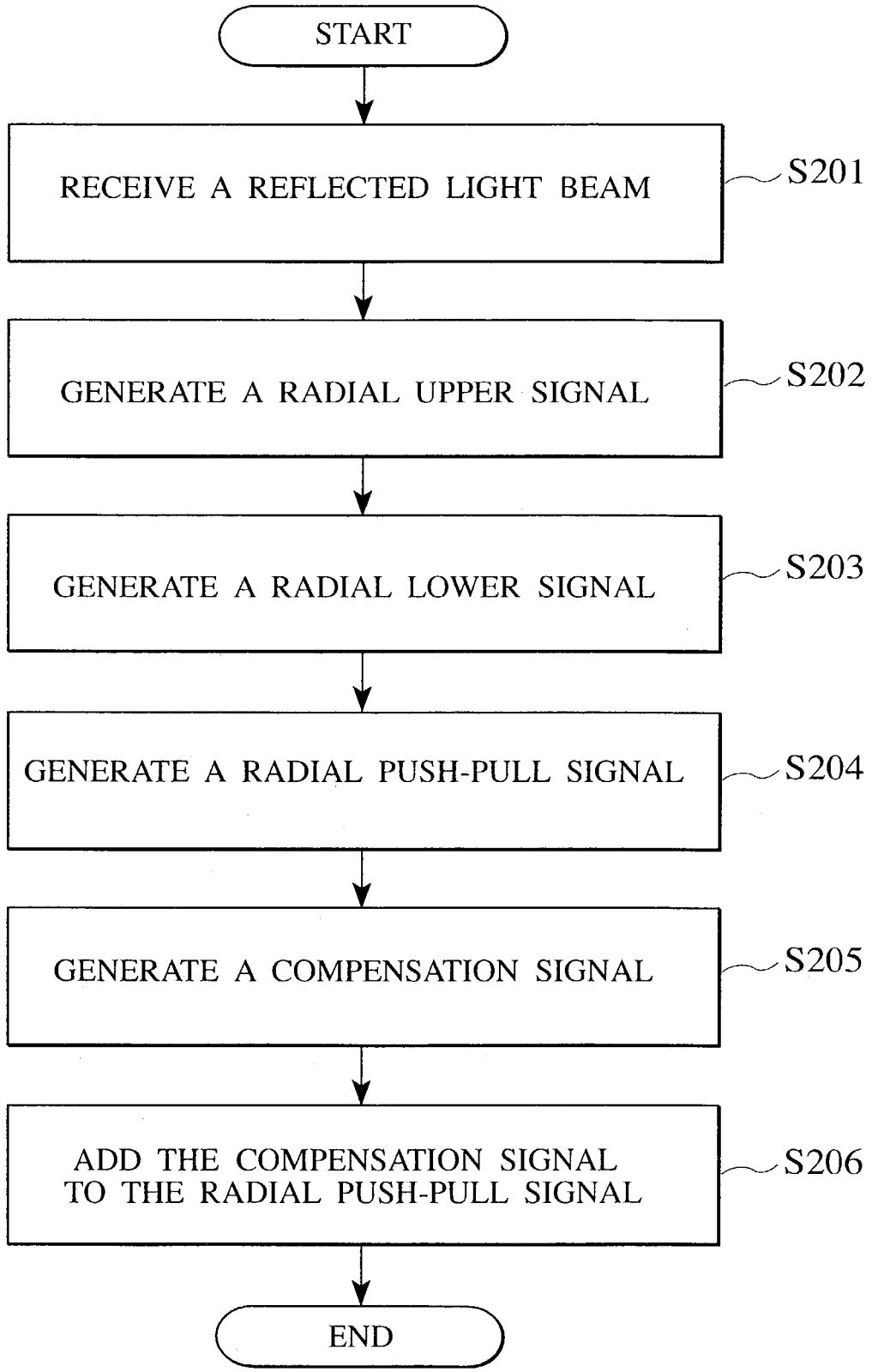
FIG. 7 is a flowchart explaining a pre-pit signal generation method according to the first embodiment of the present invention.

As shown in FIG. 7, a pre-pit signal generation method according to the first embodiment includes: Step S201 of receiving reflected light from an optical recording medium by photo detection areas bisected in a tangential direction of a recording track of the optical recording medium; Step S202 of generating a radial upper signal from light received by the photo detection area on an upside in the tangential direction; Step S203 of generating a radial lower signal from light received by the photo detection area on a downside in the tangential direction; Step S204 of subtracting the radial lower signal from the radial upper signal to generate a radial push-pull signal; Step S205 of generating a compensation signal of the radial push-pull signal at a position of a record mark on a recording track by using the radial push-pull signal and the radial upper signal; and Step S206 of adding the compensation signal to the radial push-pull signal.

The pre-pit signal generator 12a according to the first embodiment of the present invention enables to realize the accurate pre-pit detection performance whether the record mark RM exists on the groove track GV adjacent to the land pre-pit LPP or ont.

Figure 8:
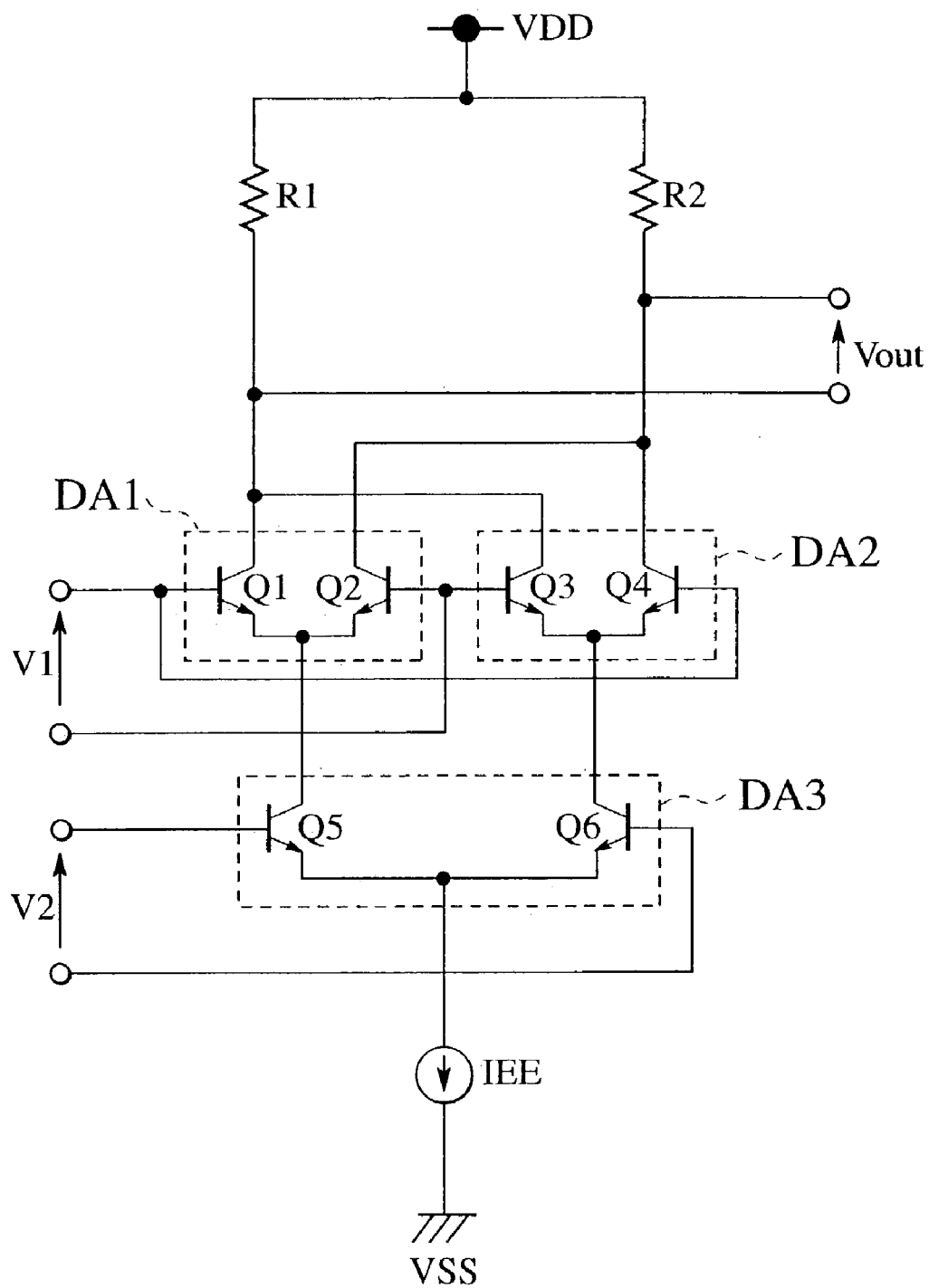
FIG. 8 is a diagram explaining a circuit example of a multiplier of the pre-pit signal generator according to the first embodiment of the present invention.

For the multiplier 25, for example, as shown in FIG. 8, it is possible to use a Gilbert Cell multiplier circuit, which receives the first input voltage V1 and the second input voltage V2 and outputs a differential voltage generated between the load resistors R1 and R2 as the output voltage Vout. The Gilbert Cell multiplier circuit includes the first differential amplifier circuit DA1 configured to receive the first input voltage V1, the second differential amplifier circuit DA2 connected in parallel to the first differential amplifier circuit DA1, and the third differential amplifier circuit DA3 configured to receive the second input voltage V2.

Figure 9A:
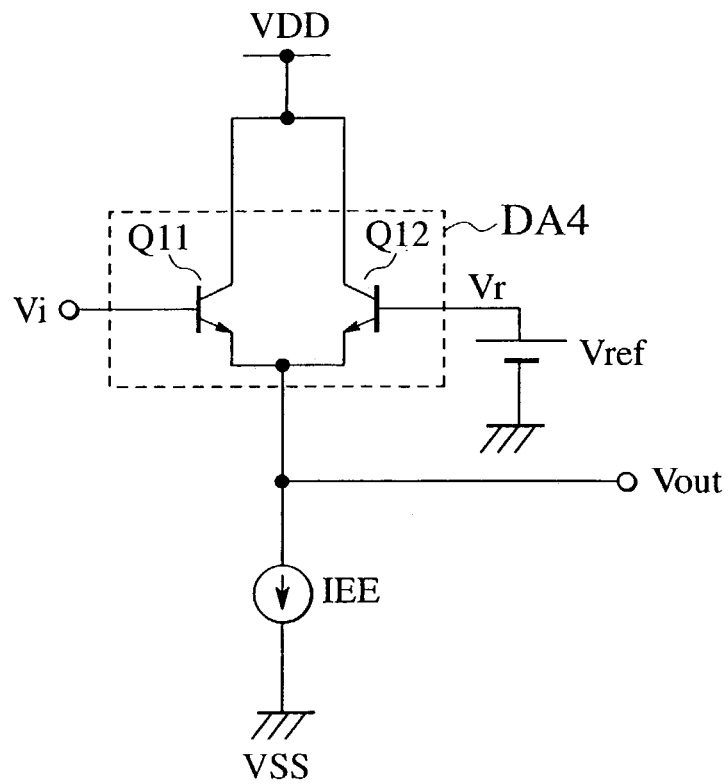
FIG. 9A is a diagram explaining a circuit example of a first half-wave rectifier of the pre-pit signal generator according to the first embodiment.

As shown in FIG. 9A, the first half-wave rectifier 26 includes, for example, the differential amplifier circuit DA4 received the input voltage Vi by one terminal and the reference voltage Vref by the other terminal. The differential amplifier circuit DA4 includes the first and second npn transistors Q11 and Q12. The first npn transistor Q11 includes a base terminal receiving the input voltage Vi, a collector terminal connected to the high power supply VDD, and an emitter terminal connected to the low power supply VSS through the current source IEE. The second npn transistor Q12 includes a base terminal receiving the reference voltage Vref, a collector terminal connected to the high power supply VDD, and an emitter terminal connected to the low power supply VSS through the current source IEE.

Figure 9B:
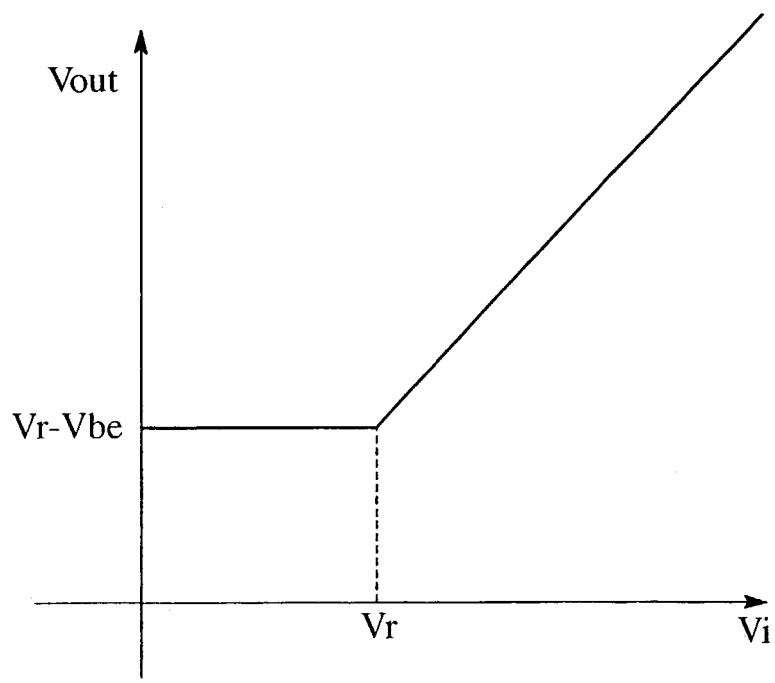
FIG. 9B is a graph explaining input/output characteristics of the circuit example of the first half-wave rectifier of the pre-pit signal generator according to the first embodiment.

The input/output characteristics of the first half-wave rectifier 26 illustrated in FIG. 9A will be described with reference to FIG. 9B. The base-emitter voltage is defined as Vbe, and the output voltage of the reference voltage source Vref is defined as Vr. When the input voltage Vi is higher than the reference output voltage Vr, the first npn transistor Q11 is turned ON and operates as a normal emitter follower. The output voltage Vout is represented as: Vout=Vi−Vbe. In this case, a gain between the input and output of the first half-wave rectifier 26 becomes 1. When the input voltage Vi is lower than the reference output voltage Vr, the second npn transistor Q12 is turned ON, and the output voltage Vout is represented as: Vout=Vr−Vbe. Specifically, when the input voltage Vi is shifted to the positive side with respect to the reference output voltage Vr, the input voltage Vi is transmitted, and when the input voltage Vi is shifted to the negative side, a fixed potential is transmitted to carry out a half-wave rectification operation. When the input voltage Vi is nearly equal to the reference output voltage Vr, the first and second npn transistors Q11 and Q12 are turned ON and operate in a linear region. The differential amplifier circuit DA4 operates as an differential amplifier. The output voltage Vout is represented as: Vout=(Vi−Vr)/2+Vr−Vbe. In this case, the gain between the input and output of the first half-wave rectifier 26 is ½.

Description is schematically made on the premise that the respective waveforms shown in FIGS. 6B to 6I are ideal waveforms without noise. The actual radial push-pull signal R((a+b)+(c+d)) has a waveform in which a wobble component and a noise component are superposed on each other. In the first half-wave rectifier 26, the gain when the input voltage Vi is nearly equal to the reference output voltage Vr becomes half of the gain when the input voltage Vi is higher than the reference output voltage Vr. Specifically, the first half-wave rectifier 26 removes the noise component when the input voltage Vin becomes nearly equal to the reference output voltage Vr.

Figure 10A:
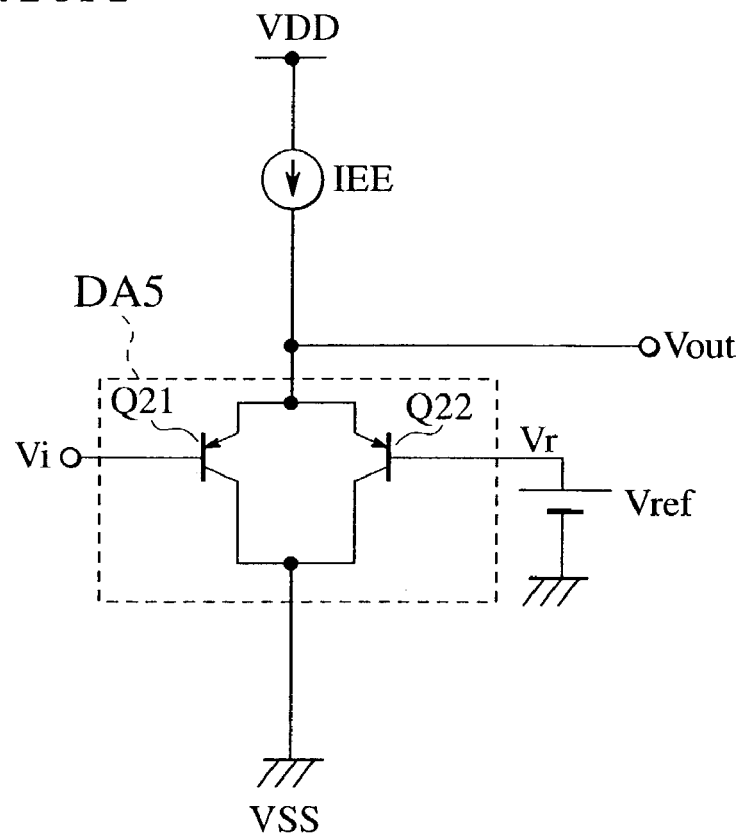
FIG. 10A is a diagram explaining a circuit example of a second half-wave rectifier of the pre-pit signal generator according to the first embodiment.

As shown in FIG. 10A, the second half-wave rectifier 27 includes, for example, the differential amplifier circuit DA5. The differential amplifier circuit DA5 includes the first and second pnp transistors Q21 and Q22. The first pnp transistor Q21 includes a base terminal configured to receive the input voltage Vi, a collector terminal connected to the high power supply VDD through the current source IEE, and an emitter terminal connected to the low power supply VSS. The second pnp transistor Q22 includes a base terminal receiving the reference voltage Vref, a collector terminal connected to the high power supply VDD through the current source IEE, and an emitter terminal connected to the low power supply VSS.

Figure 10B:
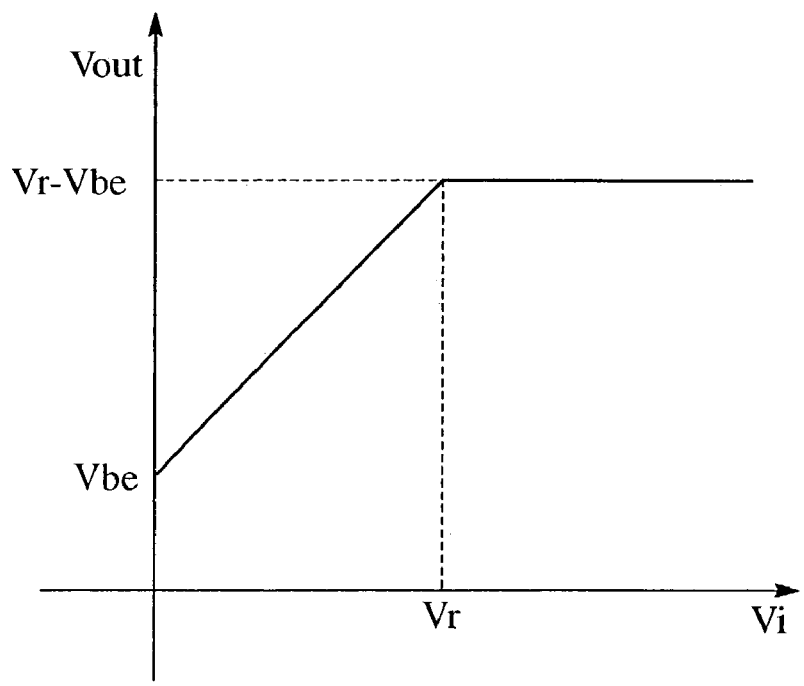
FIG. 10B is a graph explaining input/output characteristics of the circuit example of the second half-wave rectifier of the pre-pit signal generator according to the first embodiment.

The input/output characteristics of the second half-wave rectifier 27 illustrated in FIG. 10A will be described with reference to FIG. 10B. The base-emitter voltage is defined as Vbe, and the output voltage of the reference voltage source Vref is defined as Vr. When the input voltage Vi is lower than the reference output voltage Vr, the first pnp transistor Q21 is turned ON and operate as a normal emitter follower. The output voltage Vout becomes a voltage obtained by shifting the input voltage Vi by the base-emitter voltage of the first pnp transistor Q21 and is represented as: Vout=Vi−Vbe. In this case, a gain between the input and output of the second half-wave rectifier 27 becomes 1. When the input voltage Vi is higher than the reference output voltage Vr, the second pnp transistor Q22 is turned ON, and the output voltage Vout becomes a voltage obtained by shifting the reference output voltage Vr by the base-emitter voltage Vbe of the second pnp transistor Q22, and is represented as: Vout=Vr−Vbe. Specifically, when the input voltage Vi is shifted to the positive side with respect to the reference output voltage Vr, the input voltage Vi is transmitted, and when the input voltage Vi is shifted to the negative side, a fixed potential is transmitted to carry out a half-wave rectification operation. When the input voltage Vi is nearly equal to the reference output voltage Vr, the first and second pnp transistors Q21 and Q22 are turned ON and operate in a linear region. The differential amplifier circuit DA5 operates as an differential amplifier. The output voltage Vout becomes a signal obtained by halving a differential voltage between Vi and Vr and shifting the halved voltage by the base-emitter voltage Vbe of the transistor. The output voltage is represented as: Vout=(Vi−Vr)/2+Vr−Vbe. In this case, the gain between the input and output of the second half-wave rectifier 27 is ½. When the first and second pnp transistors Q21 and Q22 operate in the vicinity of the reference output voltage Vr under the condition where the input voltage Vi is nearly equal to the reference output voltage Vr, both of the first and second pnp transistors Q21 and Q22 are turned ON and operate in a linear region. Therefore, the differential amplifier circuit DA5 operates as an differential amplifier, a signal obtained by halving a differential voltage between Vi and Vr and shifting the halved voltage by the base-emitter voltage Vbe of the transistor is transmitted to the Vout output, and the output voltage is represented as: Vout=(Vi−Vr)/2+Vr−Vbe. In this case, the gain between the input and output of the second half-wave rectifier 27 is ½. This half-wave rectifier has an effect of removing the noise component in the vicinity of the reference output voltage Vr and the wobble component of the radial push-pull signal.

SECOND EMBODIMENT

Figure 11:
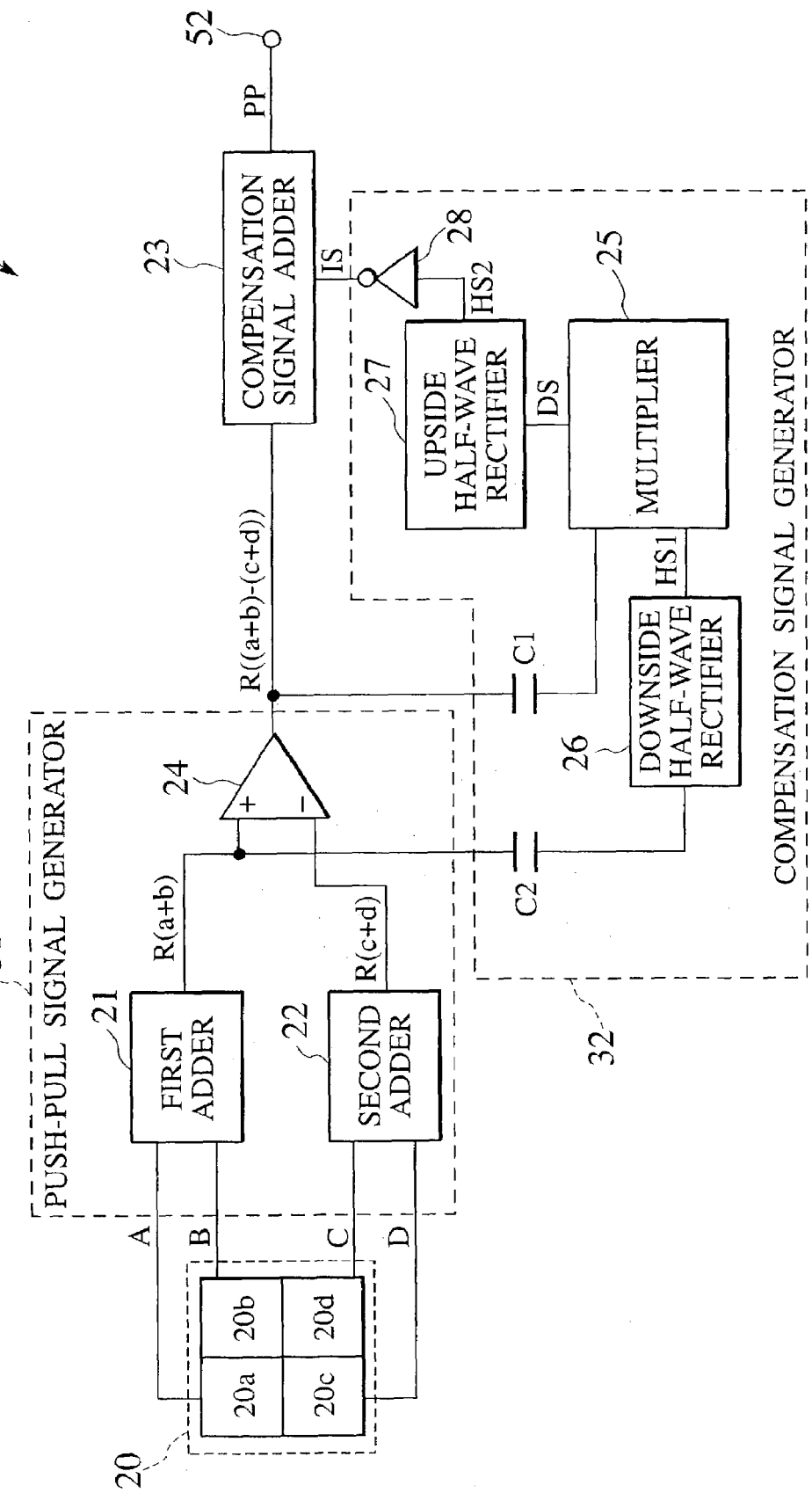
FIG. 11 is a diagram explaining a pre-pit signal generator according to a second embodiment of the present invention.

The pre-pit signal generator 12b according to a second embodiment of the present invention is also used for the recording and playback apparatus shown in FIG. 1. As illustrated in FIG. 11, in the pre-pit signal generator 12b according to the second embodiment of the present invention, the first half-wave rectifier 26 is connected between the second capacitor C2 and the second input terminal of the multiplier 25 while the first half-wave rectifier 26 shown in FIG. 5 is connected between the first capacitor C1 and the input of the multiplier 25. Besides the above, the second embodiment is substantially similar to the first embodiment. Therefore, repeated description will be omitted.

Figure 12A:
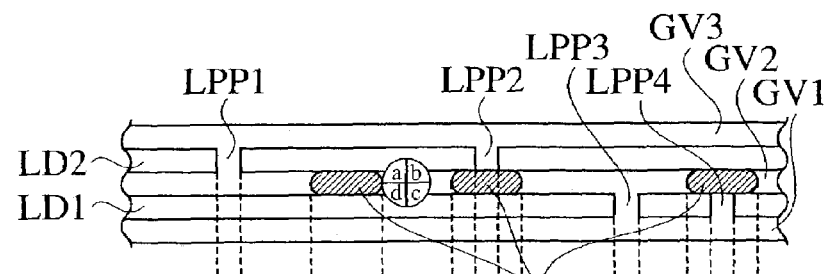
FIGS. 12A to 12I are timing charts of the pre-pit signal generator according to the second embodiment of the present invention.
Figure 12B:
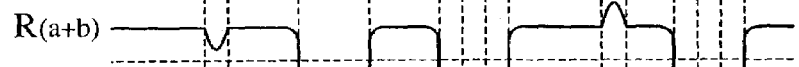
Figure 12C:
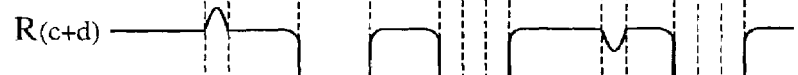
Figure 12D:
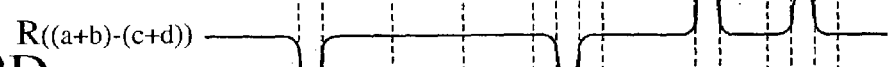
Figure 12E:
Figure 12F:
Figure 12G:
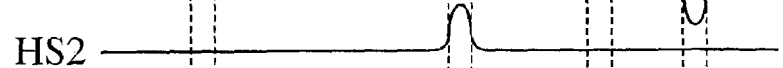
Figure 12H:
Figure 12I:

The operation of the pre-pit signal generator 12b illustrated in FIG. 11 will be described with reference to FIG. 12. The description will be schematically made on the premise that the recording and playback unit 2 moves on the groove track GV2 of the already recorded optical recording medium 1 illustrated in FIG. 12A while irradiating a light beam thereinto. While the first half-wave rectifier 26 shown in FIG. 5 performs the half-wave rectification for the radial push-pull signal R((a+b)−(c+d)), the first half-wave rectifier 26 illustrated in FIG. 11 performs the half-wave rectification for the radial upper signal R(a+b). The output signal of the first half-wave rectifier 26 has a peak on a negative side at the position of the record mark RM as shown in FIG. 12E, and is transmitted to the second input terminal of the multiplier 25. As shown in FIG. 12F, the multiplier 25 transmits a signal having a positive peak at the position of the land pre-pit LPP2 to be detected and a signal having a negative peak at the position of the land pre-pit LPP4 not to be detected. As shown in FIG. 12G, the second half-wave rectifier 27 passes only a signal having a positive peak therethrough. As shown in FIG. 12H, the inverter 28 inverts and amplifies the output signal of the second half-wave rectifier 27. The compensation signal adder 23 adds together the compensation signal transmitted from the inverter 28 and the radial push-pull signal R((a+b)+(c+d)), as sown in FIG. 12I, to generate the pre-pit signal PP at the position of the land pre-pit to be detected.

The pre-pit signal generator 12b according to the second embodiment of the present invention enables to realize accurate pre-pit detection performance no matter whether or not the record mark RM exists on the groove track GV adjacent to the land pre-pit LPP.

THIRD EMBODIMENT

Figure 13:
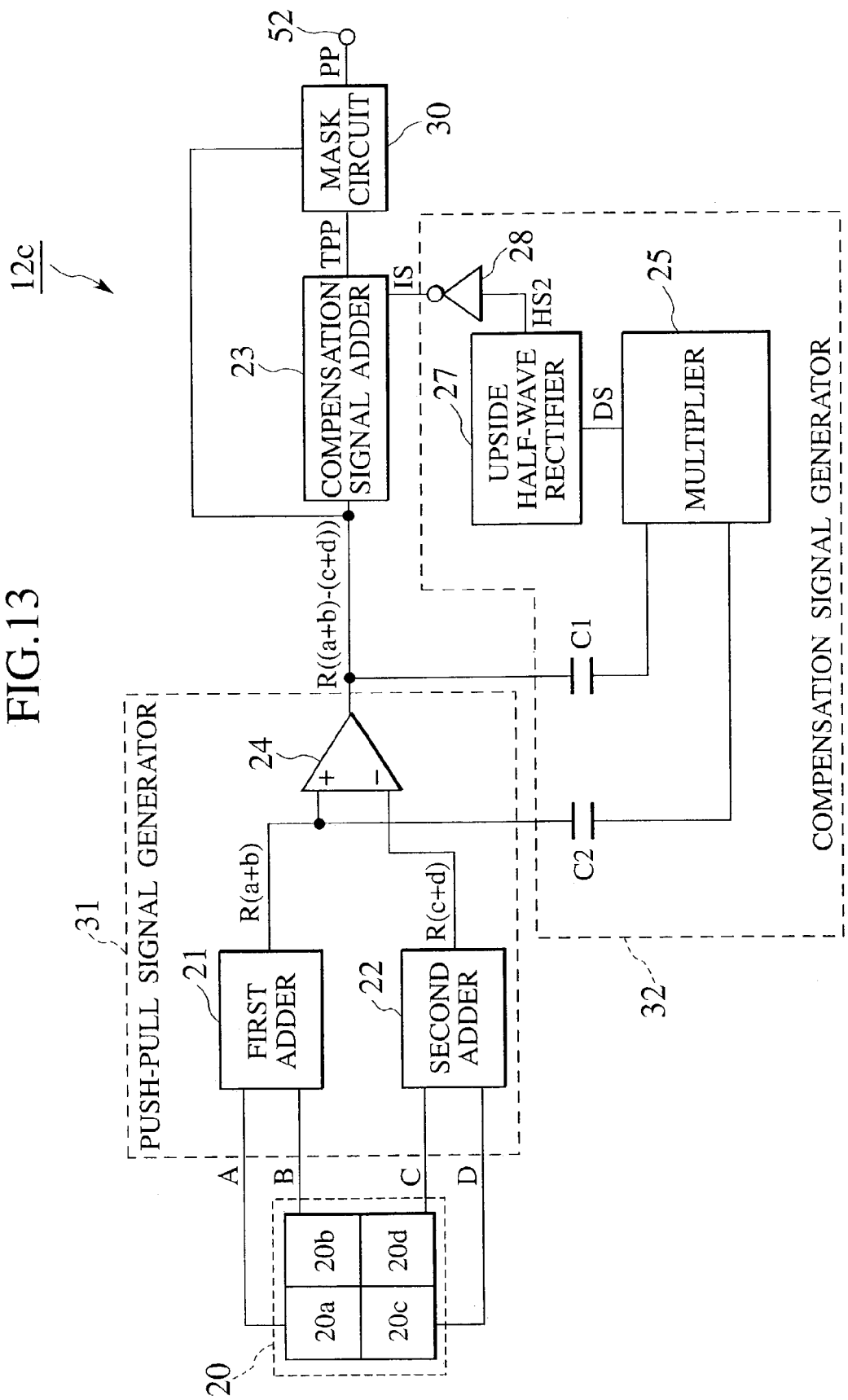
FIG. 13 is a diagram explaining a pre-pit signal generator according to a third embodiment of the present invention.

The pre-pit signal generator 12c according to a third embodiment of the present invention is also used for the recording and playback apparatus shown in FIG. 1. As illustrated in FIG. 13, the pre-pit signal generator 12c according to the third embodiment is configured in such a manner that a circuit corresponding to the first half-wave rectifier 26 in the first and second embodiments is deleted and the mask circuit 30 is provided between the output terminal of the compensation signal adder 23 and the output terminal 52. The mask level input terminal of the mask circuit 30 is connected to the output terminal of the subtractor 24. Besides the above, the third embodiment is substantially similar to the first embodiment. Therefore, repeated description will be omitted.

The operation of the pre-pit signal generator 12c illustrated in FIG. 13 will be described with reference to FIG. 13. The description will be schematically made on the premise that the recording and playback unit 2 moves on the groove track GV2 of the already recorded optical recording medium 1 illustrated in FIG. 14A while irradiating a light beam thereinto. The multiplier 25 multiplies a signal obtained by removing a DC component from the radial push-pull signal R((a+b)−(c+d)) through the first capacitor C1 and a signal obtained by removing a DC component from the radial upper signal R(a+b) through the second capacitor C2. As shown in FIG. 14E, the multiplier 25 outputs the signal having positive peaks at the positions of the land pre-pits LPP1 and LPP4 and negative peaks at the positions of the land pre-pits LPP2 and LPP3 to the second half-wave rectifier 27. As shown in FIG. 14F, the output of the second half-wave rectifier 27 outputs the signal having positive peaks at the positions of the land pre-pits LPP2 and LPP3. As shown in FIG. 14G, the inverter 28 inverts and amplifies the output signal of the second half-wave rectifier 27. The compensation signal adder 23 adds together the compensation signal transmitted from the inverter 28 and the radial push-pull signal R((a+b)−(c+d)) to generate the temporal pre-pit signal TPP including the false pre-pit signal FPP as shown in FIG. 14H. The false pre-pit signal FPP is a signal that undesirably detects a land pre-pit LPP not to be detected. As shown in FIG. 14I, the mask circuit 30 generates the mask signal MS when the radial push-pull signal R((a+b)−(c+d)) shown in FIG. 14D exceeds the slice level SL1. As shown in FIG. 14J, the false pre-pit signal FPP is removed by the mask signal MS.

The pre-pit signal generator 12c according to the third embodiment of the present invention enables to realize the accurate pre-pit detection performance no matter whether or not the record mark RM exists on the groove track GV adjacent to the land pre-pit LPP.

FOURTH EMBODIMENT

Figure 15:
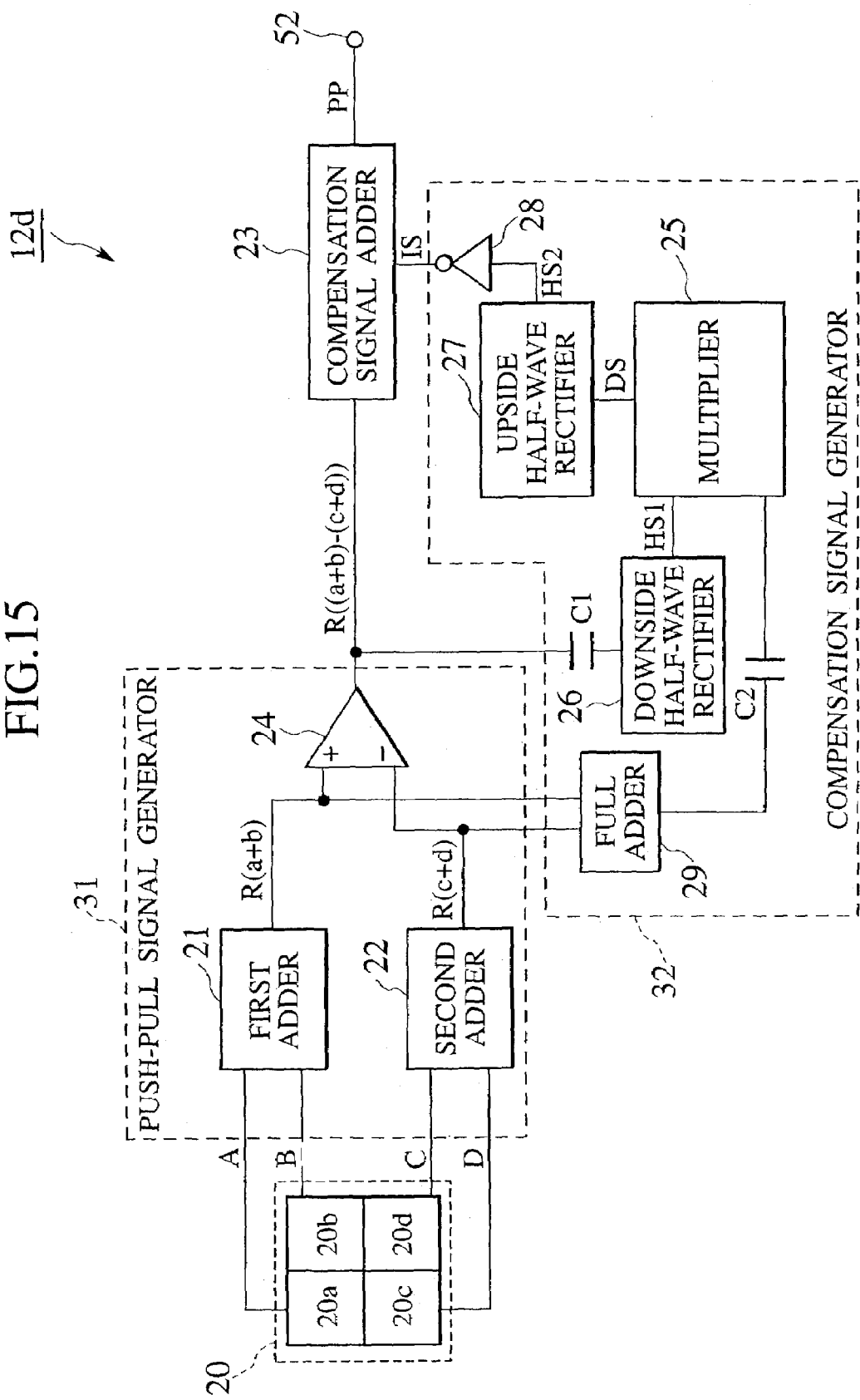
FIG. 15 is a diagram explaining a pre-pit signal generator according to a fourth embodiment of the present invention.
Figure 17A:
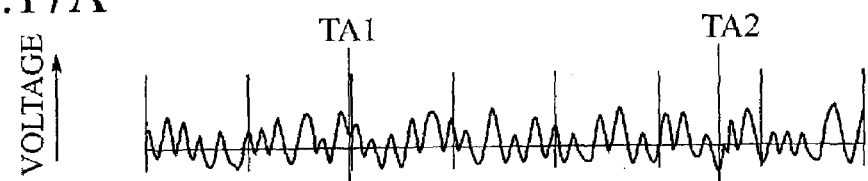
FIGS. 17A to 17F are simulation waveforms of the pre-pit signal generator according to the fourth embodiment of the present invention.
Figure 17B:
Figure 17C:
Figure 17D:
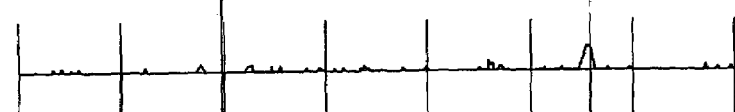
Figure 17E:
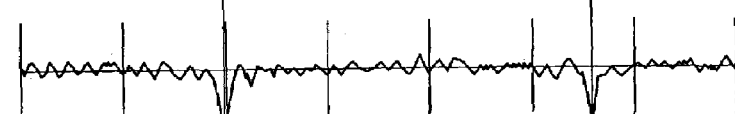
Figure 17F:

The pre-pit signal generator 12d according to a fourth embodiment of the present invention is also used for the recording and playback apparatus shown in FIG. 1. The pre-pit signal generator 12d according to the fourth embodiment includes the fourth adder 29 between the output of the first adder 21 and the second capacitor C2, which are shown in FIG. 5. As illustrated in FIG. 15, the fourth adder 29 includes the first input terminal connected to the output terminal of the first adder 21, and the second input terminal connected to the output terminal of the second adder 22. Besides the above, the fourth embodiment is substantially similar to the first embodiment. Therefore, repeated description will be omitted.

The operation of the pre-pit signal generator 12d illustrated in FIG. 15 will be described with reference to FIG. 16. The description will be schematically made on the premise that the recording and playback unit 2 moves on the groove track GV2 of the already recorded optical recording medium 1 illustrated in FIG. 16A while irradiating a light beam thereinto. The fourth adder 29 adds together the radial upper signal R(a+b) and the radial lower signal R(c+d) to output the fully added signal R(a+b+c+d) as shown in FIG. 16D. The fully added signal R(a+b+c+d) is not varied in level depending on the positions of the land pre-pits LLP when the record mark RM is read. The multiplier 25 multiplies the output signal of the first (downside) half-wave rectifier 26 and a signal obtained by removing a DC component from the fully added signal R(a+b+c+d) through the second capacitor C2. As shown in FIG. 16G, the signal obtained by the multiplication has a negative peak at the position of the land pre-pit LPP1 and a positive peak at the position of the LPP2, and is transmitted to the input side of the second half-wave rectifier 27. As shown in FIG. 16H, the second half-wave rectifier 27 passes only the signal having the positive peak therethrough. As shown in FIG. 16I, the inverter 28 inverts and amplifies the output signal of the second half-wave rectifier 27. The compensation signal adder 23 adds together the compensation signal transmitted from the inverter 28 and the radial push-pull signal R((a+b)−(c+d)) to generate the pre-pit signals PP at the positions of the land pre-pits LPP to be detected as shown in FIG. 16J.

The waveforms shown in FIG. 17 were obtained from the simulation results of the pre-pit signal generator 12d illustrated in FIG. 15. At the time TA1, the land pre-pits LPP are detected at the positions where the record marks RM do not exist. At the time TA2, the land pre-pits LPP are detected at the positions where the record marks RM exist. The waveform of FIG. 17A corresponds to the radial upper signal R(a+b) shown in FIG. 16B. The waveform of FIG. 17B corresponds to the radial lower signal R(c+d) shown in FIG. 16C. The waveform of FIG. 17C corresponds to the radial push-pull signal R((a+b)−(c+d)) shown in FIG. 16E. The waveform of FIG. 17D corresponds to the output signal of the second half-wave rectifier 27 shown in FIG. 16H. The waveform of FIG. 17E corresponds to the pre-pit signal PP shown in FIG. 16J. FIG. 17F shows the waveform of the pre-pit signal PP in the second related art.

Figure 18A:
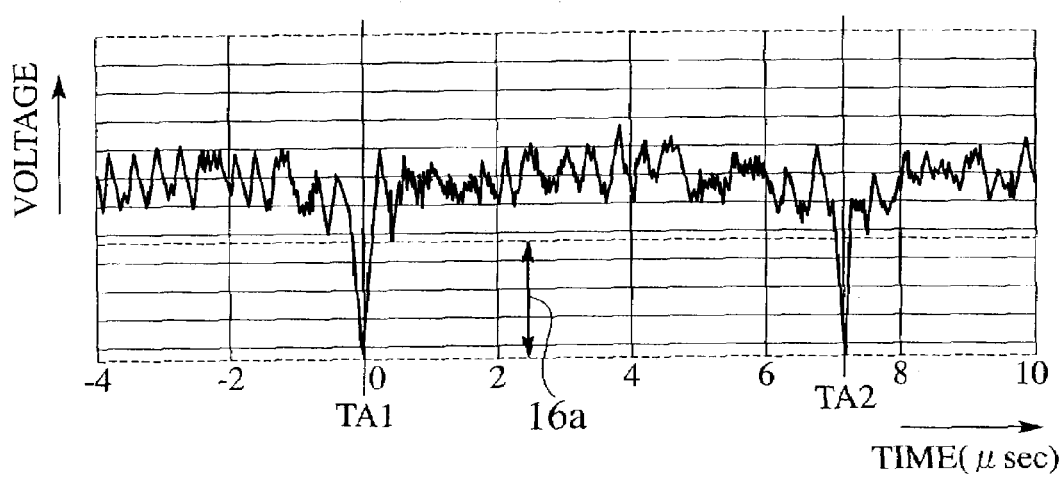
FIGS. 18A and 18B are graphs comparing a waveform of a pre-pit signal generated by the pre-pit signal generator according to the four embodiment of the present invention with a waveform of a pre-pit signal in accordance with a related art.
Figure 18B:
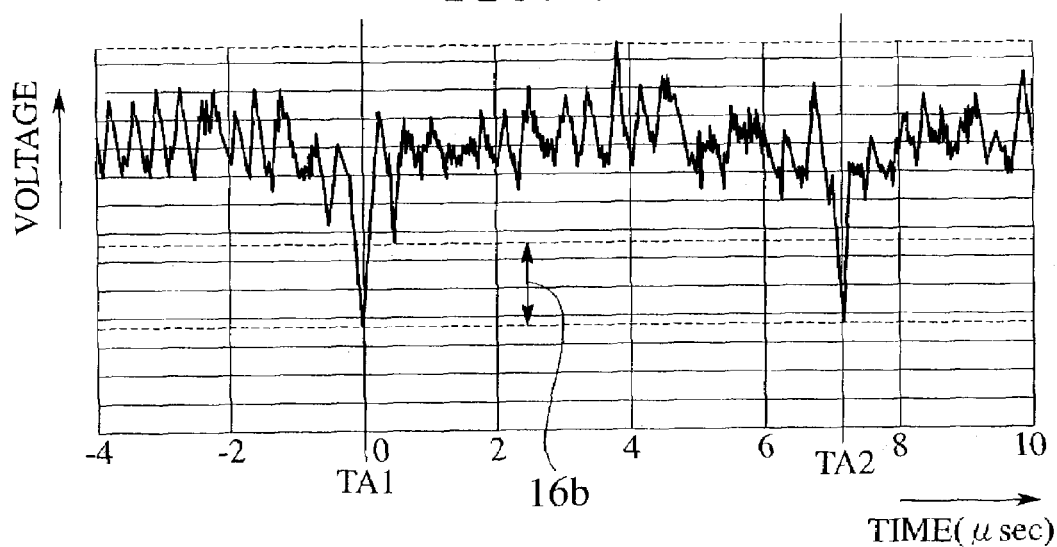

FIG. 18A shows the enlarged waveform of the pre-pit signal PP generated by the pre-pit signal generator 12d illustrated in FIG. 15. FIG. 18B shows the enlarged waveform of the pre-pit signal PP according to the second related art. The time TA1 is a time when the land pre-pit LPP is detected at the position where the record mark RM does not exist. The time TA2 is a time when the land pre-pit LPP is detected at the position where the record mark RM exists. At the time TA1 and the time TA2, the potential levels of the pre-pit signals PP on the negative side are nearly equal to each other. However, the amplitude of the noise included in the pre-pit signal PP of the second related art is larger. The binarizable range 16a of the pre-pit signal PP generated by the pre-pit signal generator 12d illustrated in FIG. 15 is wider than the binarizable range 16b of the related art. The fact that the binarizable range is wide results in an effect that the pre-pit detection is difficult to be affected by the noise and the like. Specifically, the pre-pit signal generator 12d according to the fourth embodiment enables accurate and stable pre-pit detection.

Moreover, the fully added signal R(a+b+c+d) is not varied in level depending on the detected positions of the land pre-pits. In comparison with the case of using the radial upper signal R(a+b), a level variation at the position of the land pre-pit LPP2 is reduced, and a final compensation signal level is reduced. Hence, the same effect as the first embodiment is obtained though an effect of compensating the radial push-pull signal is somewhat deteriorated.

The pre-pit signal generator 12d according to the fourth embodiment of the present invention enables to realize accurate pre-pit detection performance no matter whether or not the record mark RM exists on the groove track GV adjacent to the land pre-pit LPP.

FIFTH EMBODIMENT

Figure 19:
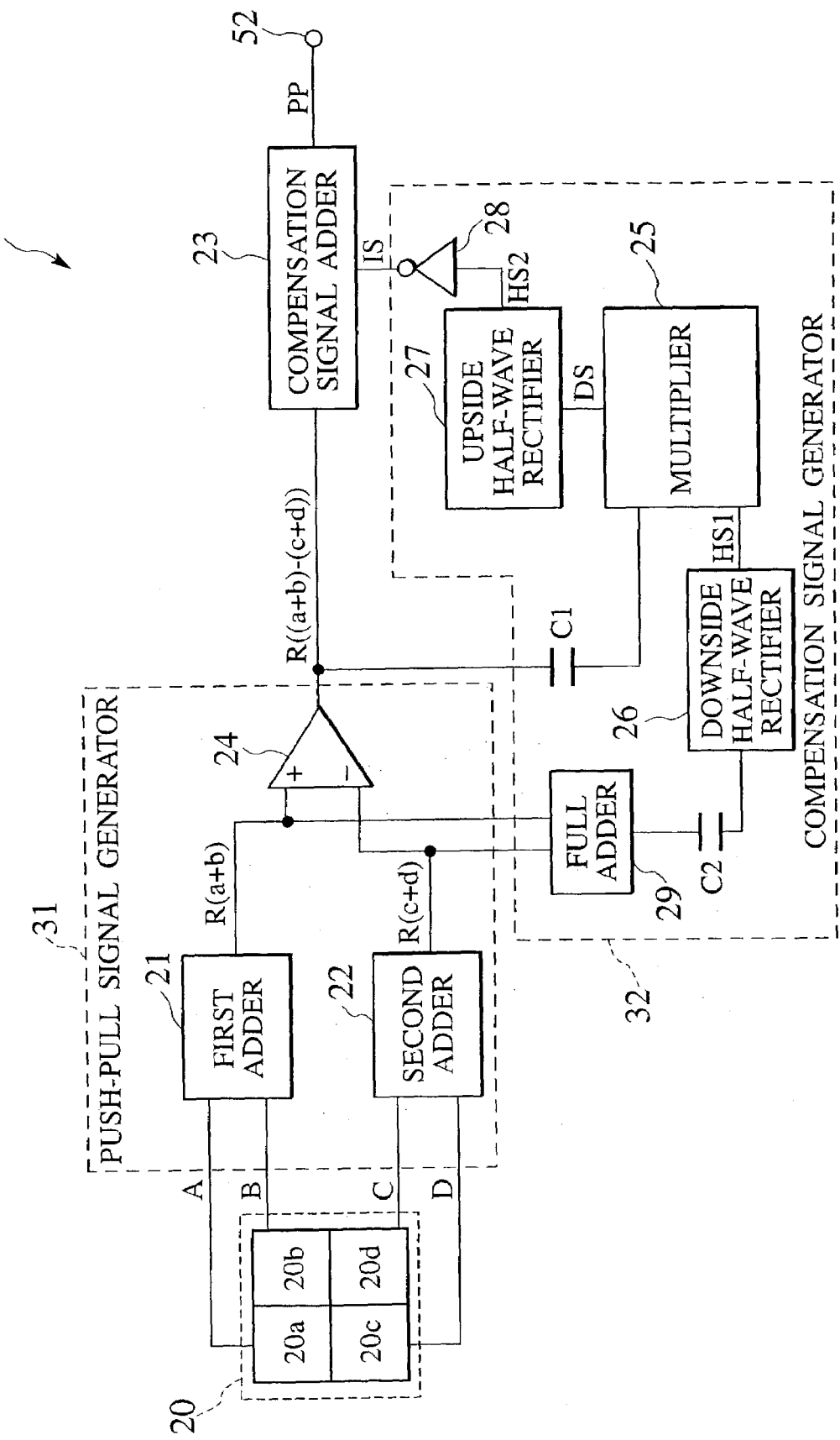
FIG. 19 is a diagram explaining a pre-pit signal generator according to a fifth embodiment of the present invention.

The pre-pit signal generator 12e according to a fifth embodiment of the present invention is also used for the recording and playback apparatus shown in FIG. 1. The first half-wave rectifier 26 shown in FIG. 15 has been connected between the first capacitor C1 and the second input terminal of the multiplier 25. Meanwhile, the first half-wave rectifier 26 shown in FIG. 19 is connected between the second capacitor C2 and the input of the multiplier 25. Besides the above, the fifth embodiment is substantially similar to the fourth embodiment. Therefore, repeated description will be omitted.

The operation of the pre-pit signal generator 12e illustrated in FIG. 19 will be described with reference to FIG. 20. The description will be schematically made on the premise that the recording and playback unit 2 moves on the groove track GV2 of the already recorded optical recording medium 1 illustrated in FIG. 20A while irradiating a light beam thereinto. As shown in FIG. 20F, the first half-wave rectifier 26 illustrated in FIG. 19 performs half-wave rectification for the fully added signal R(a+b+c+d) with a predetermined reference potential being centered. As shown in FIG. 20G, the multiplier 25 multiplies the output signal of the first half-wave rectifier 26 and a signal obtained by removing a DC component from the radial upper signal R (a+b) through the first capacitor C1. As shown in FIG. 20G, the multiplier 25 outputs the signal obtained by the multiplication, which has a positive peak at the position of the land pre-pits LPP2 and a negative peak at the position of the land pre-pits LPP4. The output signal of the multiplier 25 is transmitted to the input side of the second half-wave rectifier 27. As shown in FIG. 20H, the second (upside) half-wave rectifier 27 passes only the signal having a positive peak there through. As shown in FIG. 20I, the inverter 28 inverts and amplifies the output signal of the second half-wave rectifier 27. The compensation signal adder 23 adds together the compensation signal transmitted from the inverter 28 and the radial push-pull signal R((a+b)−(c+d)) to generate the pre-pit signals PP at the positions of the land pre-pits LPP to be detected.

The pre-pit signal generator 12e according to the fifth embodiment of the present invention enables to realize the accurate pre-pit detection performance no matter whether or not the record mark RM exists on the groove track GV adjacent to the land pre-pit LPP.

SIXTH EMBODIMENT

Figure 21:
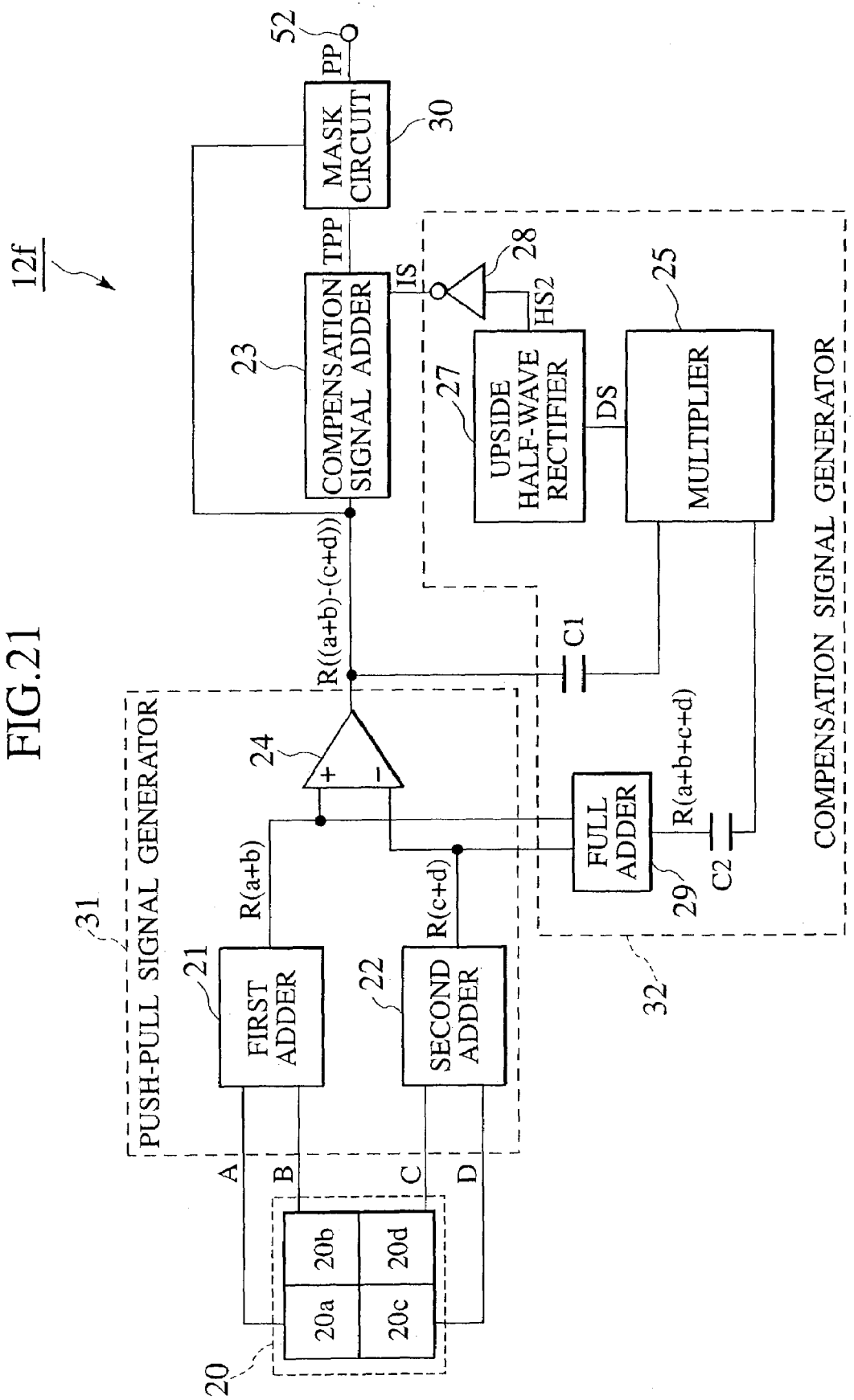
FIG. 21 is a diagram explaining a pre-pit signal generator according to a sixth embodiment of the present invention.

The pre-pit signal generator 12f according to the sixth embodiment of the present invention is also used for the recording and playback apparatus shown in FIG. 1. As shown in FIG. 21, the pre-pit signal generator 12f according to the sixth embodiment deletes the first half-wave rectifier 26 illustrated in FIGS. 15 and 19 therefrom, and includes the mask circuit 30 between the output terminal of the compensation signal adder 23 and the output terminal 52. The mask level input terminal of the mask circuit 30 is connected to the output terminal of the subtractor 24. Besides the above, the sixth embodiment is substantially similar to the first embodiment. Therefore, repeated description will be omitted.

Figure 22A:
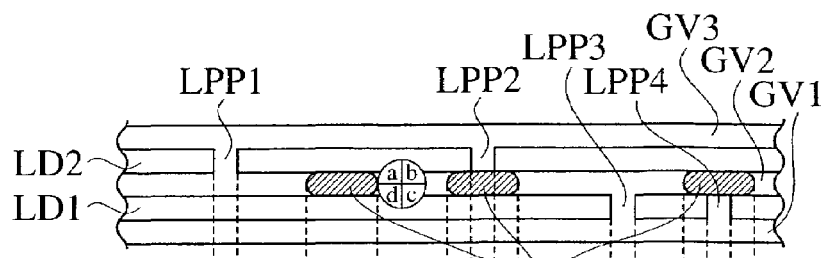
FIGS. 22A to 22K are timing charts of the pre-pit signal generator according to the sixth embodiment of the present invention.
Figure 22B:
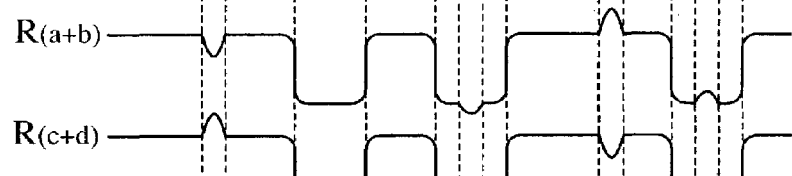
Figure 22C:
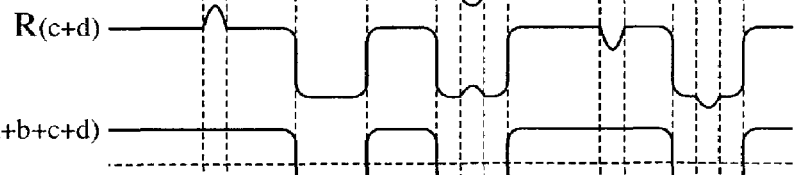
Figure 22D:
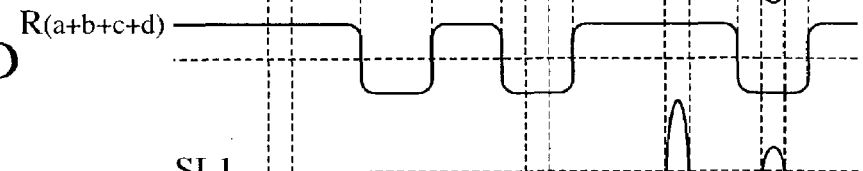
Figure 22E:
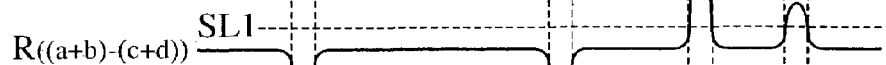
Figure 22F:
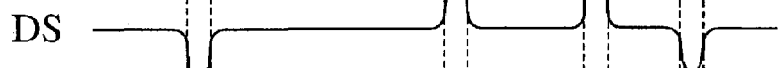
Figure 22G:
Figure 22H:
Figure 22I:
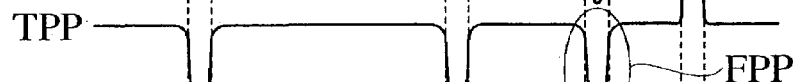
Figure 22J:
Figure 22K:

The operation of the pre-pit signal generator 12f illustrated in FIG. 21 will be described with reference to FIG. 22. The description will be schematically made on the premise that the recording and playback unit 2 moves on the groove track GV2 of the already recorded optical recording medium 1 illustrated in FIG. 22A while irradiating a light beam thereinto. The multiplier 25 for use in the pre-pit signal generator 12f according to the sixth embodiment multiplies a signal obtained by removing a DC component from the radial push-pull signal R((a+b)−(c+d)) and a signal obtained by removing a DC component from the fully added signal R(a+b+c+d). As shown in FIG. 22F, the multiplier 25 outputs the signal obtained by the multiplication, which has positive peaks at the positions of the land pre-pits LPP2 and LPP3 and negative peaks at the positions of the land pre-pits LPP1 and LPP4 to the second half-wave rectifier 27. As shown in FIG. 22G, the second half-wave rectifier 27 passes only the signal having a positive peak. As shown in FIG. 22H, the inverter 28 inverts and amplifies the output signal of the second half-wave rectifier 27. The compensation signal adder 23 adds together the compensation signal transmitted from the inverter 28 and the radial push-pull signal R((a+b)−(c+d)) to generate the false pre-pit signal FPP and the temporal pre-pit signals TPP as shown in FIG. 22I. The mask circuit 30 generates the mask signal MS as shown in FIG. 22J when the radial push-pull signal R((a+b)−(c+d)) shown in FIG. 22E exceeds the slice level SL1. The false pre-pit signal FPP is removed by the mask signal MS as shown in FIG. 22k.

The pre-pit signal generator 12f according to the sixth embodiment of the present invention enables to realize the accurate pre-pit detection performance no matter whether or not the record mark RM exists on the groove track GV adjacent to the land pre-pit LPP.

Various modifications will become possible for those skilled in the art after receiving the teaching of the present disclosure without departing from the scope thereof.

What is claimed is:

1. A pre-pit signal generator comprising:
   a push-pull signal generator configured to subtract a radial lower signal received by a downside photo detection area partitioned in a tangential direction of a recording track of an optical recording medium, from a radial upper signal received by an upside photo detection area partitioned in the tangential direction, and to generate a radial push-pull signal for detecting a position of a land pre-pit;
   a compensation signal generator configured to generate a compensation signal when a record mark on the recording track and the land pre-pit are adjacent to each other; and
   a compensation signal adder configured to add together the radial push-pull signal and the compensation signal.

2. The pre-pit signal generator of claim 1, wherein the compensation signal is generated by multiplying the radial push-pull signal and the radial upper signal.

3. The pre-pit signal generator of claim 1, wherein the radial upper signal is generated based on two signals detected by photo detection areas bisected at the upside photo detection area in a vertical direction of the recording track.

4. The pre-pit signal generator of claim 1, wherein the radial lower signal is generated based on two signals detected by photo detection areas bisected at the downside photo detection area in a vertical direction of the recording track.

5. The pre-pit signal generator of claim 1, wherein the compensation signal generator generates the compensation signal by use of the radial push-pull signal and a fully added signal obtained by adding together the radial upper signal and the radial lower signal.

6. The pre-pit signal generator of claim 1, wherein the compensation signal generator comprises:
   a multiplier having a first input terminal to which is transmitted the radial push-pull signal, and a second input terminal to which is transmitted the radial upper signal;
   a half-wave rectifier connected to an output side of the multiplier;
   an inverter configured to generate the compensation signal, and connected to an output side of the half-wave rectifier.

7. The pre-pit signal generator of claim 6, wherein the compensation signal generator further comprises an other half-wave rectifier having an input terminal receiving either of the radial push-pull signal and the radial upper signal, and an output terminal transmitting a rectified signal to a first input terminal of the multiplier.

8. The pre-pit signal generator of claim 1, wherein the compensation signal generator comprises:
   a full signal adder having a first input terminal receiving the radial upper signal, and a second input terminal receiving the radial lower signal;
   a multiplier having a first input terminal to which is transmitted the radial push-pull signal, and a second input terminal connected to an output side of the full signal adder;
   a half-wave rectifier connected to an output side of the multiplier; and an inverter connected to the half-wave rectifier, and configured to generate the compensation signal.

9. The pre-pit signal generator of claim 8, wherein the compensation signal generator further comprises an other half-wave rectifier having an input terminal receiving the radial push-pull signal, and an output terminal transmitting a rectified signal to one input terminal of the multiplier.

10. The pre-pit signal generator of claim 8, wherein the compensation signal generator further comprises an other half-wave rectifier connected between an output terminal of the full signal adder and the input terminal of the multiplier.

11. The pre-pit signal generator of claim 1, wherein the push-pull signal generator comprises:
a first adder having two input terminals to which are transmitted two signals detected by two upside photo detection areas bisected at the upside photo detection area in a vertical direction of the recording track;
a second adder having input terminals to which are transmitted two signals detected by two downside photo detection areas bisected at the downside photo detection area in the vertical direction of the recording track; and
a subtractor having a positive input terminal connected to an output of the first adder and a negative input terminal connected to an output of the second adder.

12. A semiconductor integrated circuit comprising:
a semiconductor chip;
a pre-pit signal generator integrated on the semiconductor chip configured to subtract a radial lower signal received by a downside photo detection area partitioned in a tangential direction of a recording track of an optical recording medium, from a radial upper signal received by an upside photo detection area partitioned in the tangential direction, and to generate a radial push-pull signal detecting a position of a land pre-pit, when a record mark on the recording track and a land pre-pit are adjacent to each other;
a recording circuit integrated on the semiconductor chip configured to recognize position information of the recording track in accordance with the pre-pit signal;
a servo controller integrated on the semiconductor chip configured to control a position of a recording and playback unit in accordance with the position information of the recording track;
a playback circuit integrated on the semiconductor chip configured to receive a reading and a playback signal and outputting playback information data to the recording and playback unit.

13. A pre-pit signal generation method comprising:
receiving a reflected light beam from an optical recording medium by photo detection areas bisected in a tangential direction of a recording track of the optical recording medium;
generating a radial upper signal from a light beam received by the photo detection area on an upside in the tangential direction;
generating a radial lower signal from a light beam received by the photo detection area on a downside in the tangential direction;
subtracting the radial lower signal from the radial upper signal to generate a radial push-pull signal;
generating a compensation signal of the radial push-pull signal based on a position of a record mark on the recording track by use of at least the radial push-pull signal and the radial upper signal; and
adding the compensation signal to the radial push-pull signal.

14. The pre-pit signal generation method of claim 13, wherein the generating of the compensation signal is based on a radial upper signal and the radial lower signal.

15. The pre-pit signal generation method of claim 13, wherein the generating of the compensation signal is based on the radial upper signal generating the compensation signal by use of the radial push-pull signal and a result of adding together the radial upper signal and the radial lower signal.

16. The pre-pit signal generation method of claim 13, wherein the generating of the compensation signal is based on the radial upper signal further generating the compensation signal based on two signals detected by photo detection areas bisected at the upside photo detection area in a vertical direction of the recording track.

17. The pre-pit signal generation method of claim 13, wherein the generating of the compensation signal is based on the radial lower signal further generating the compensation signal based on two signals being detected by photo detection areas bisected at the downside photo detection area in a vertical direction of the recording track.

* * * * *